(12) United States Patent
Huang

(10) Patent No.: US 8,533,900 B2
(45) Date of Patent: Sep. 17, 2013

(54) COMBINATIONAL STRUCTURE OF FLAT BLADE WIPER FOR VEHICLE

(76) Inventor: Shih-Hsien Huang, Kaohsiung (TW)

( * ) Notice: Subject to any disclaimer, the term of this patent is extended or adjusted under 35 U.S.C. 154(b) by 222 days.

(21) Appl. No.: 13/064,649

(22) Filed: Apr. 6, 2011

(65) Prior Publication Data

US 2011/0247167 A1    Oct. 13, 2011

(30) Foreign Application Priority Data

Apr. 9, 2010    (TW) .............................. 99111058 A

(51) Int. Cl.
*B60S 1/40*    (2006.01)
(52) U.S. Cl.
USPC .................... 15/250.43; 15/250.32
(58) Field of Classification Search
USPC  15/250.32, 250.43, 250.361, 250.44–250.48, 15/250.201
See application file for complete search history.

(56) References Cited

U.S. PATENT DOCUMENTS

| | | | |
|---|---|---|---|
| D430,097 S | 8/2000 | Breesch et al. | |
| D443,854 S | 6/2001 | De Block | |
| D457,479 S | 5/2002 | De Block et al. | |
| 6,523,218 B1 | 2/2003 | Kotlarski | |
| 6,944,905 B2 | 9/2005 | De Block et al. | |
| D511,735 S | 11/2005 | Aoyama et al. | |
| D512,362 S | 12/2005 | Breesch et al. | |
| 7,055,206 B2 | 6/2006 | Boland | |
| 7,210,189 B2 | 5/2007 | Nacamuli | |
| 7,228,588 B2 | 6/2007 | Kraemer et al. | |
| 7,305,734 B2 | 12/2007 | Boland et al. | |
| D564,434 S | 3/2008 | Claes | |
| D564,955 S | 3/2008 | Claes | |
| D579,401 S | 10/2008 | Garrastacho et al. | |
| D579,849 S | 11/2008 | Garrastacho et al. | |
| 7,484,264 B2 | 2/2009 | Kraemer et al. | |
| 7,540,061 B1 * | 6/2009 | Huang | 15/250.201 |

* cited by examiner

*Primary Examiner* — Mark Spisich
*Assistant Examiner* — Andrew A Horton
(74) *Attorney, Agent, or Firm* — Bacon & Thomas, PLLC

(57) ABSTRACT

The present invention provides a combinational structure of flat blade wiper for vehicle comprising an elastic metal keelson strip, a saddle bracket, two clipping sleeve mounts, two external covers, and an elongated scraping blade. In the saddle bracket and each clipping sleeve mount, an upper accommodating channel and a lower accommodating channel of rectangular cross sections are formed such that the elastic metal keelson strip and the upper wing section of the elongated scraping blade are inserted therein respectively. During operation, all forces of the wiper arm directly relay to the elongated scraping blade to achieve the water-scraping effect. Thereby, the force transmission is consistent throughout the wiping operation, avowing pauses and jerky wiper movement. Thus, not only the service life of assembled components are prolonged but also replacing costs thereof are reduced owing to motive and wearing burdens of the wiper arm are decreased.

17 Claims, 19 Drawing Sheets

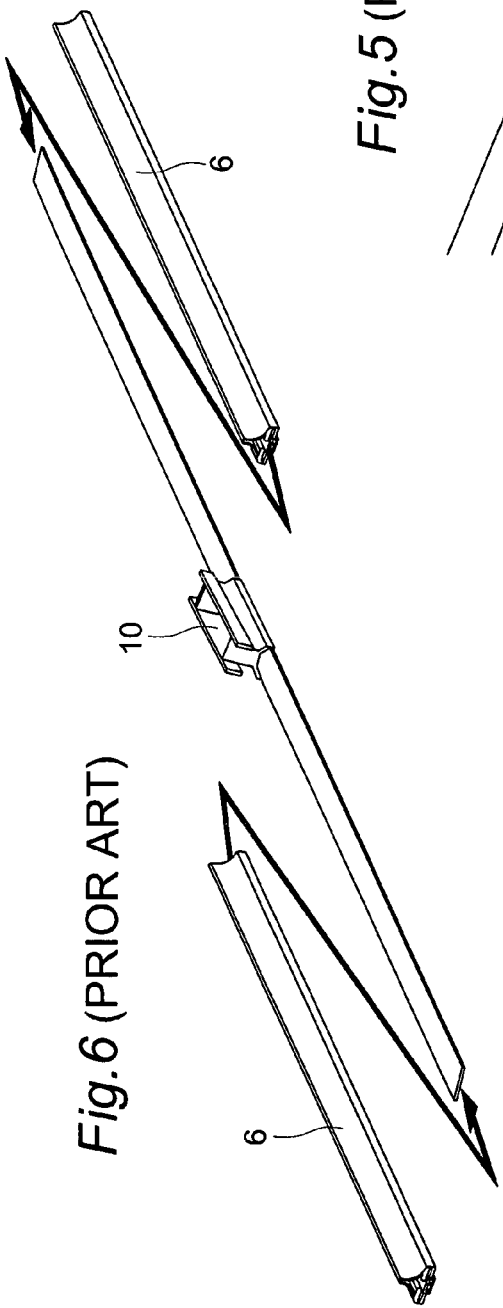
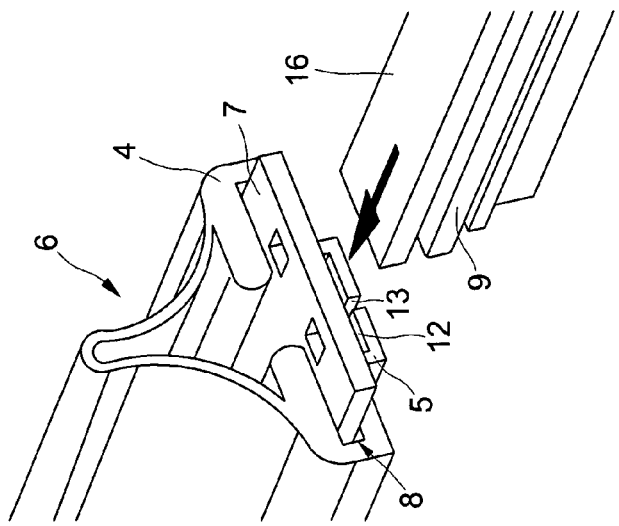
Fig.6 (PRIOR ART)
Fig.5 (PRIOR ART)
Fig.4 (PRIOR ART)

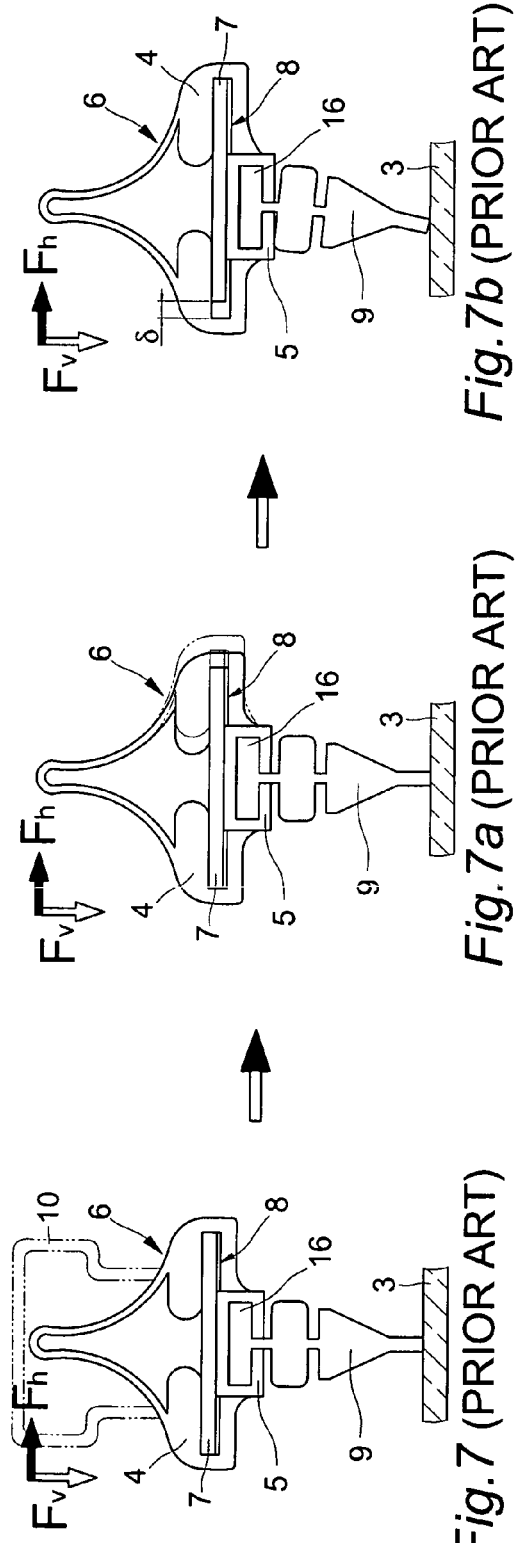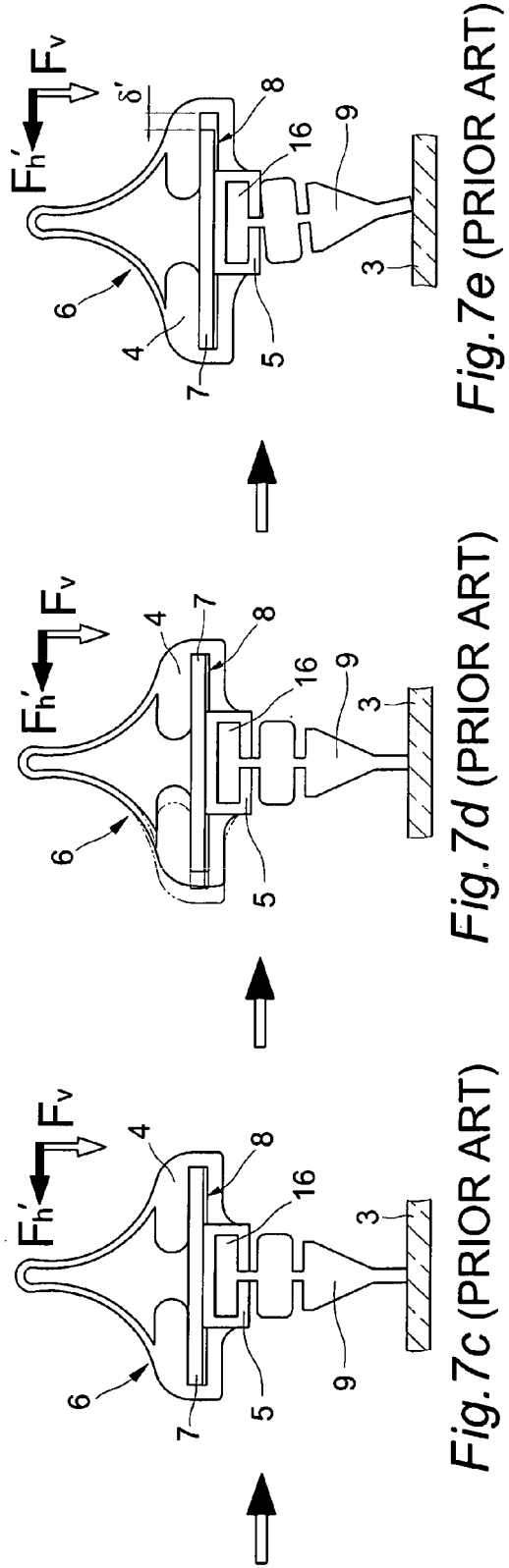

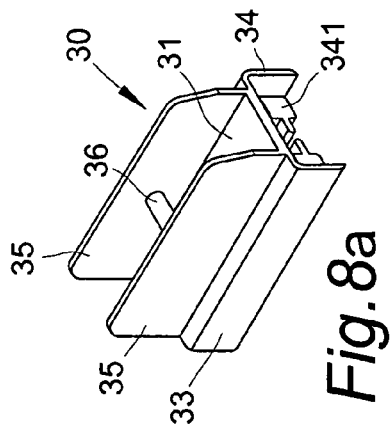
Fig. 8a
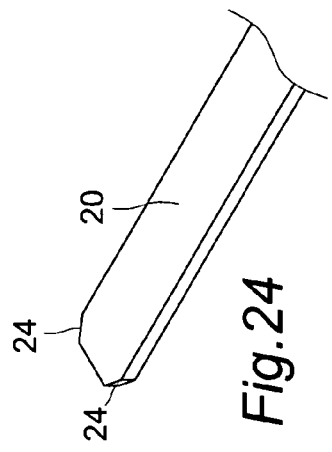
Fig. 23
Fig. 24
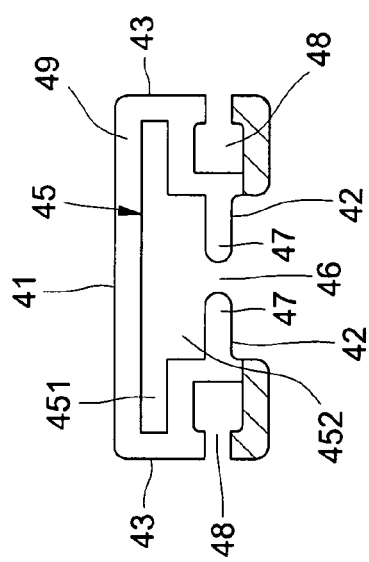
Fig. 26
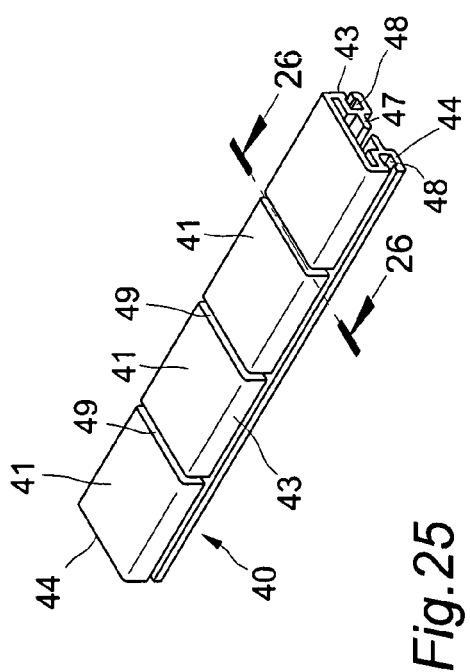
Fig. 25

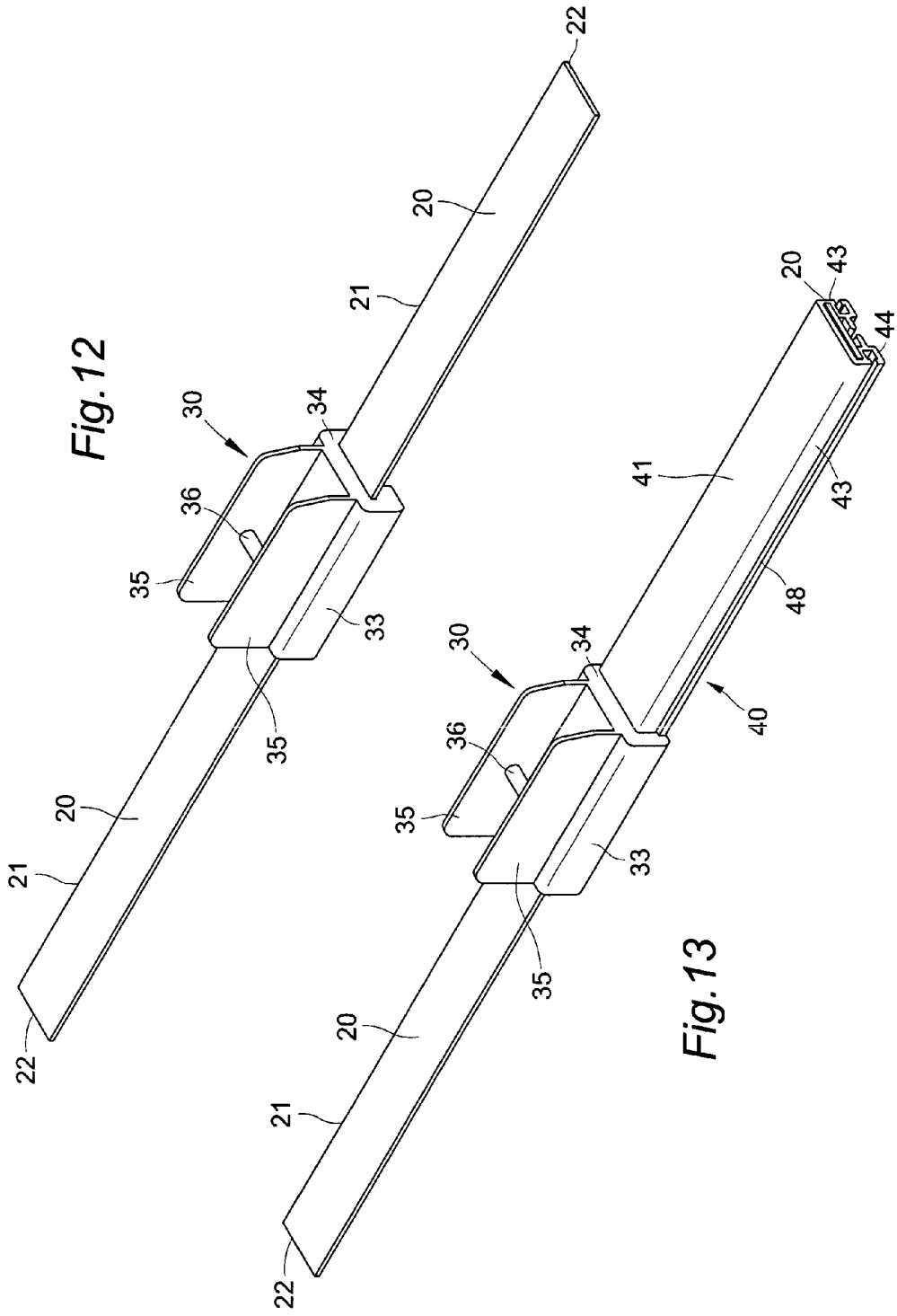

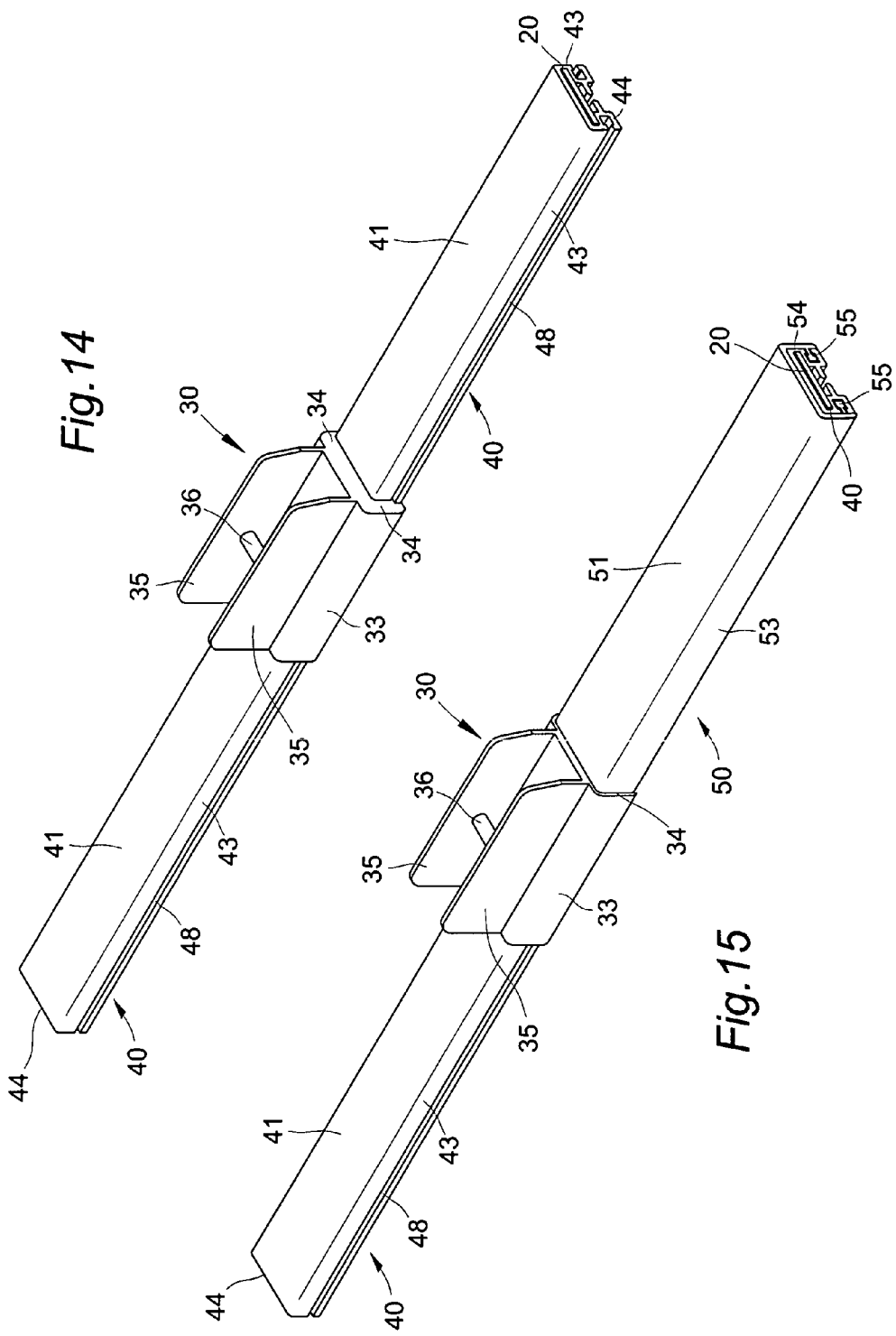

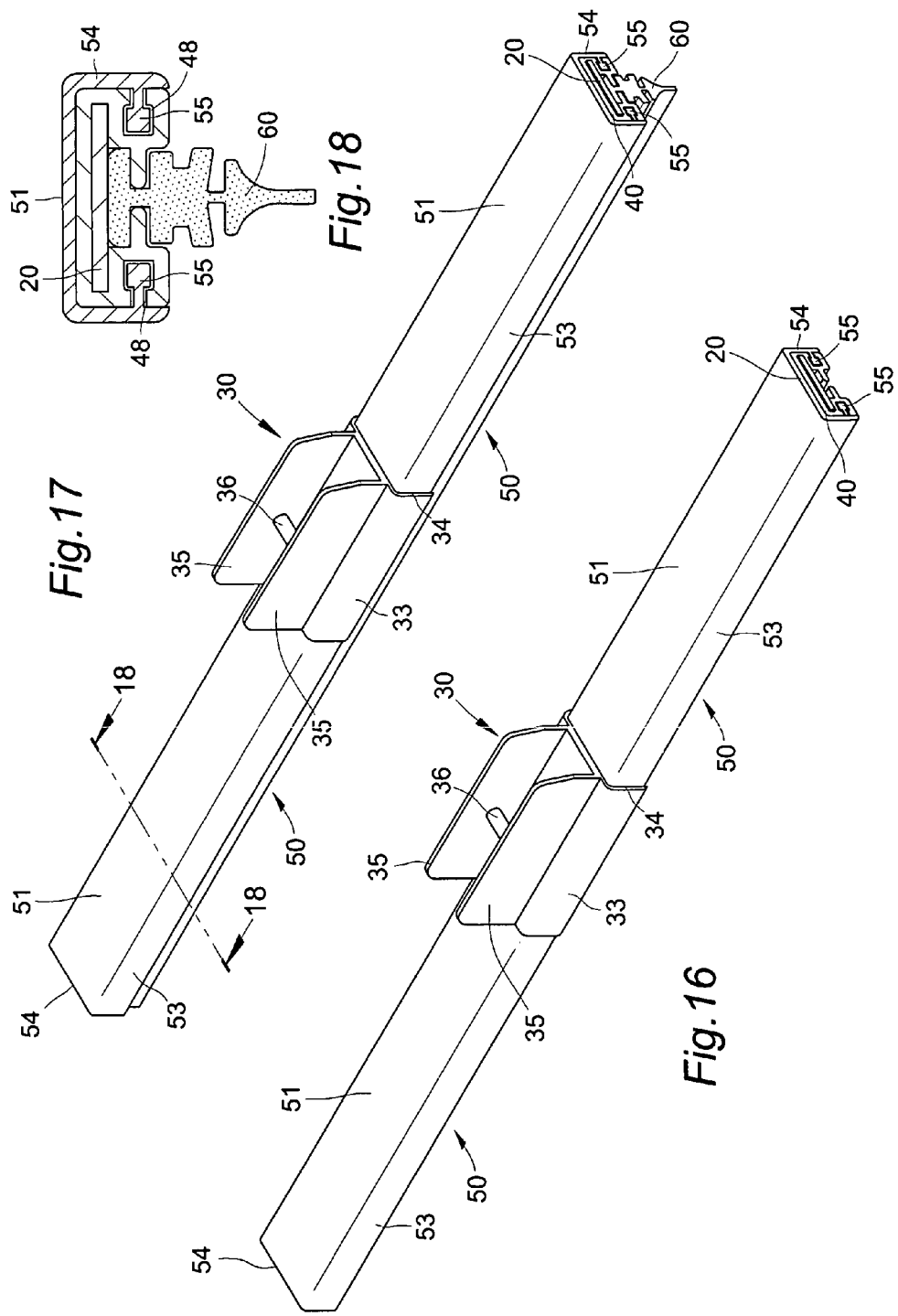

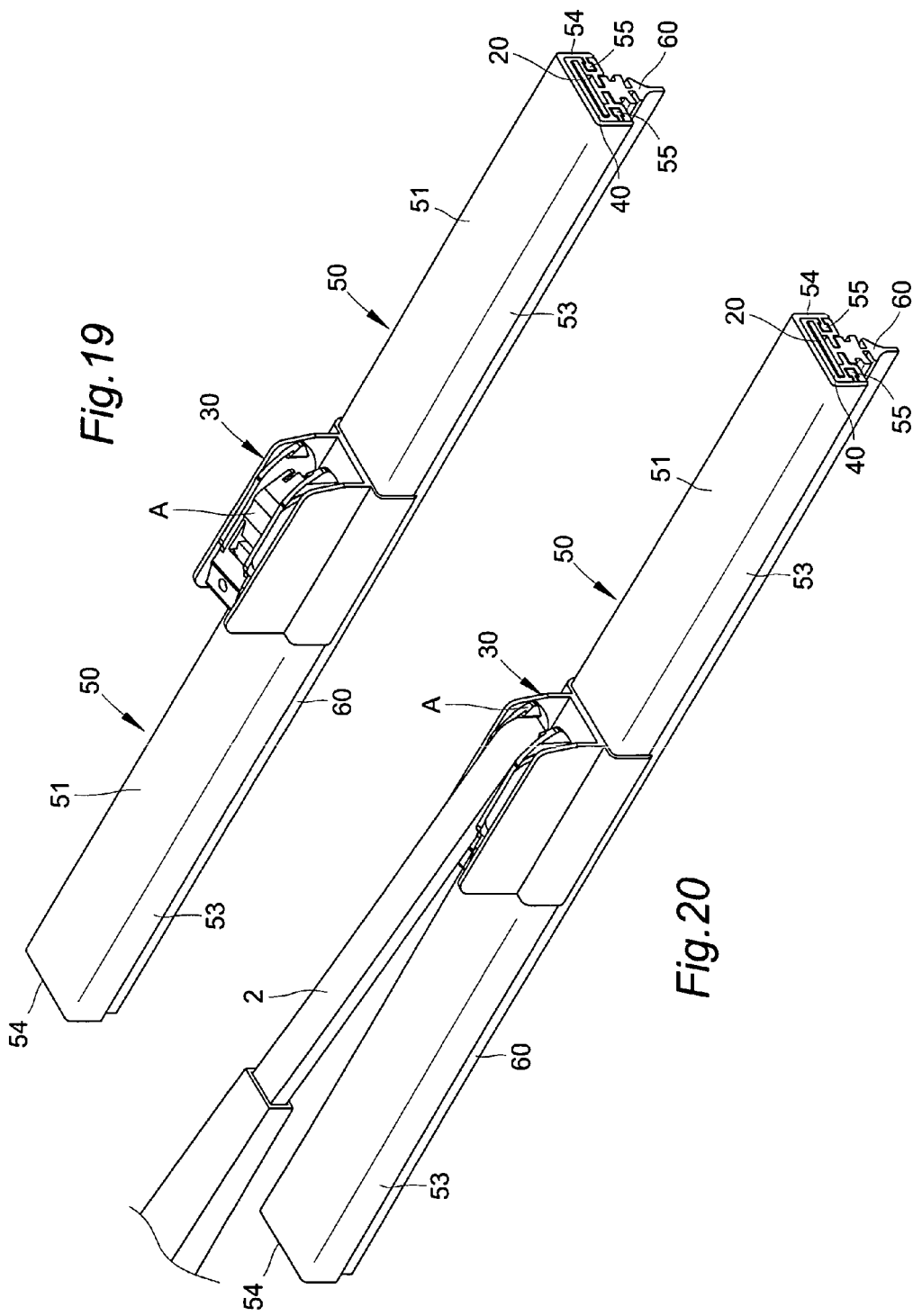

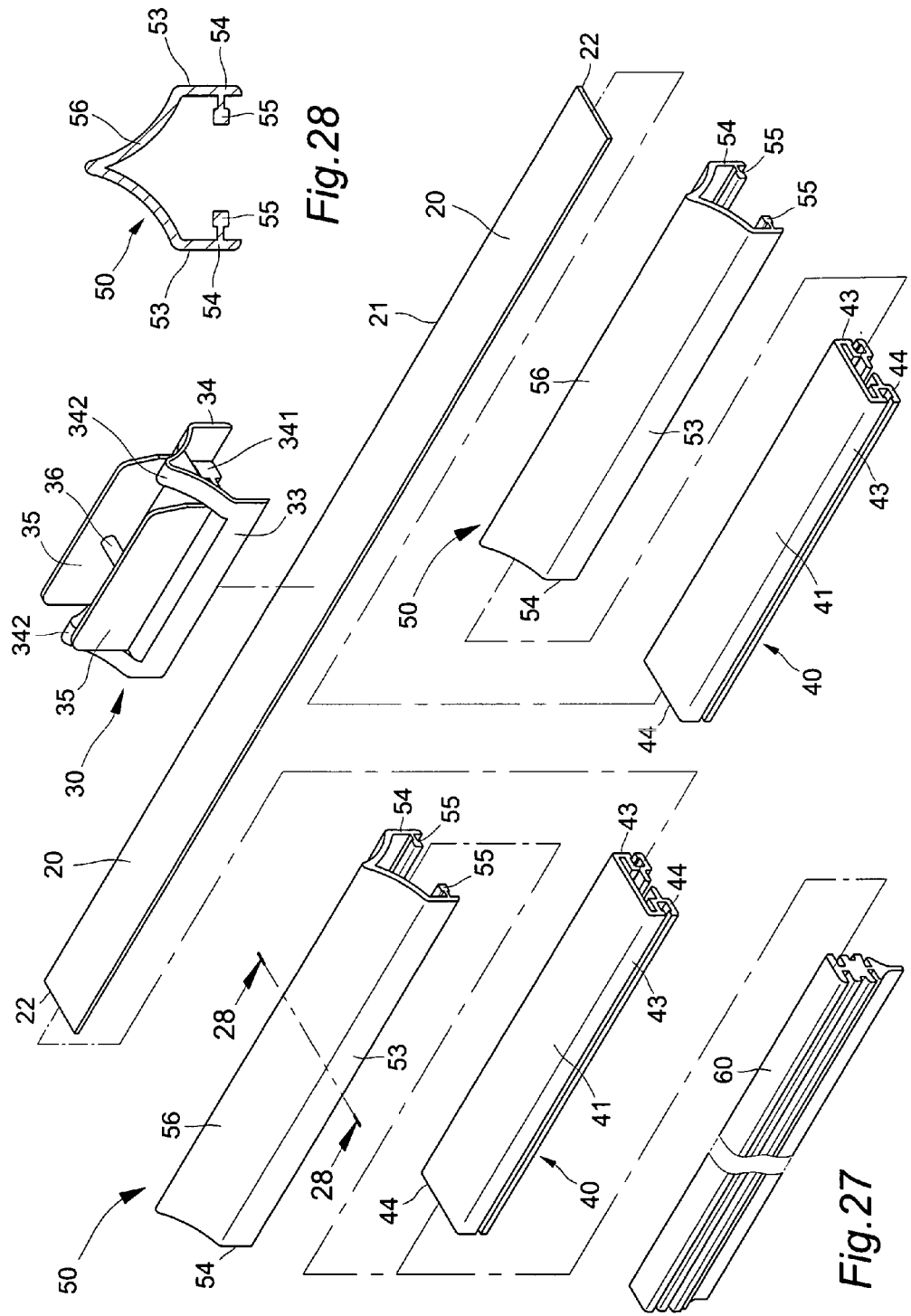

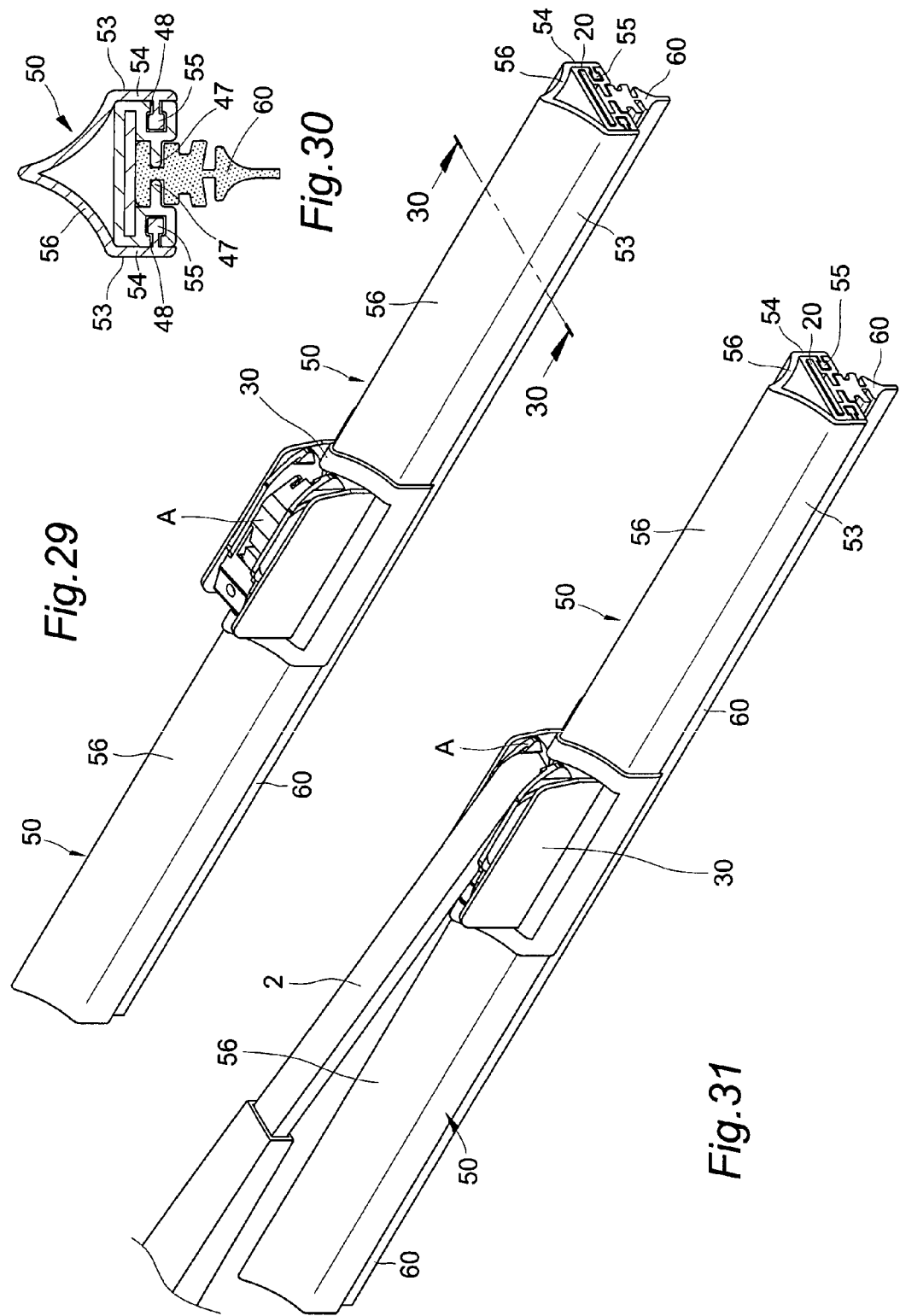

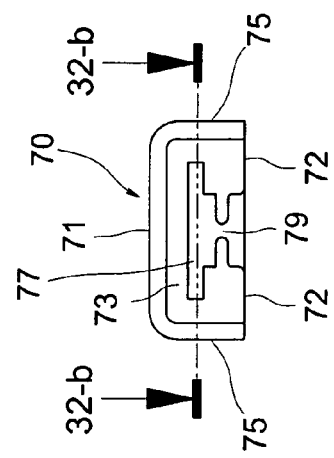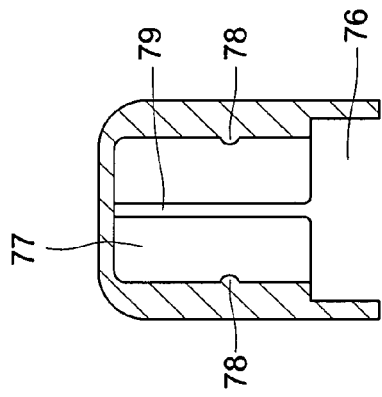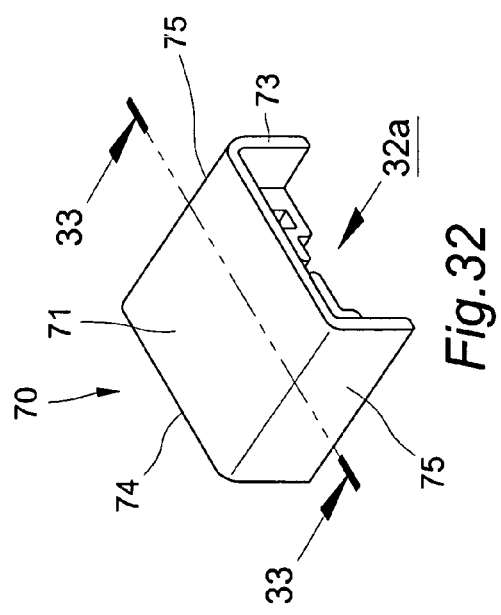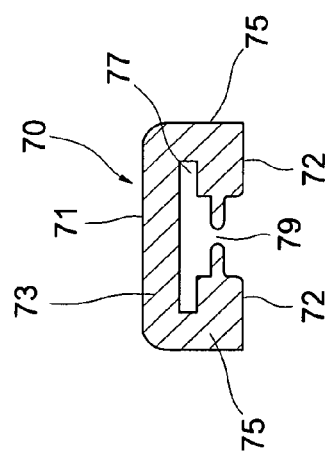

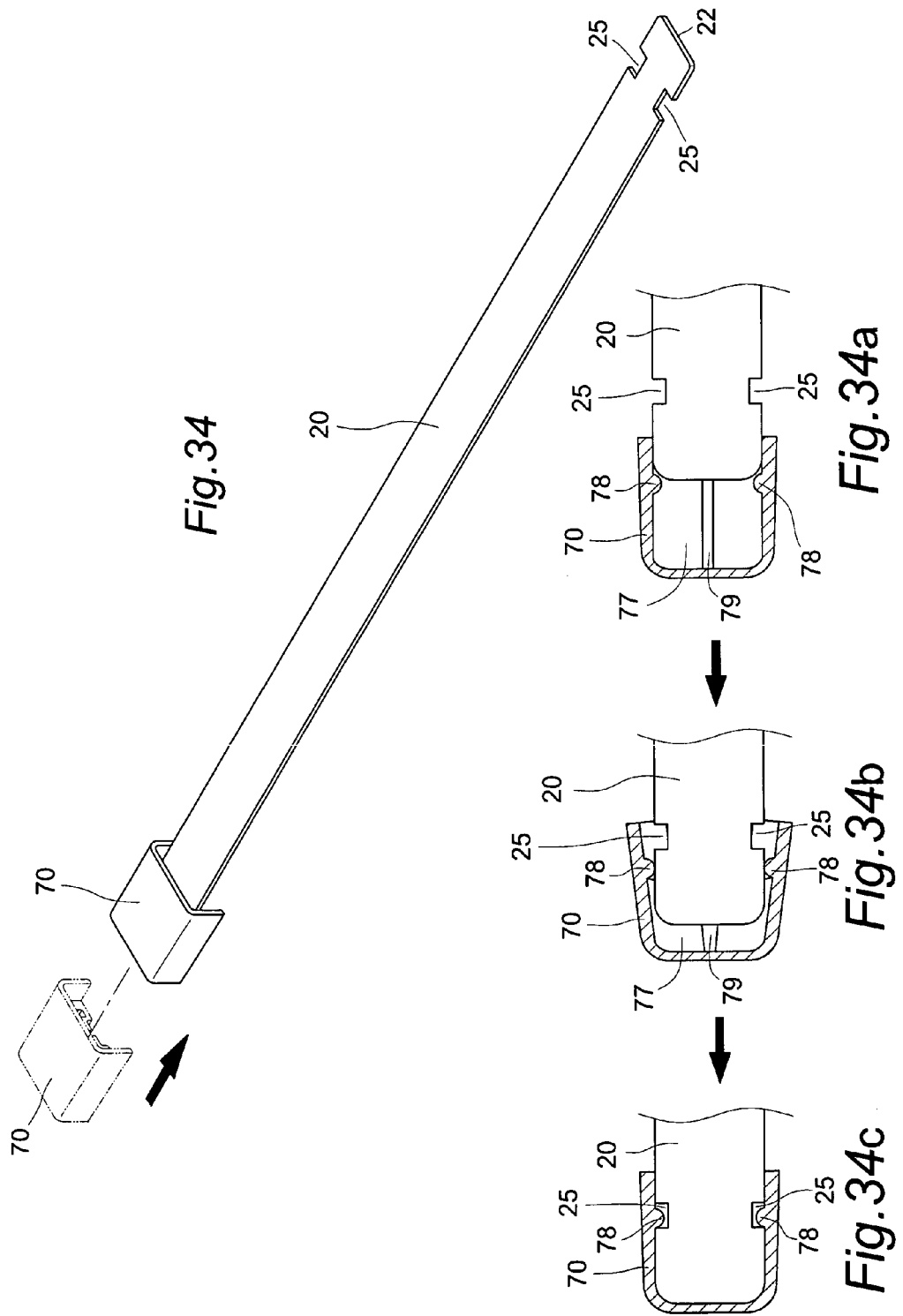

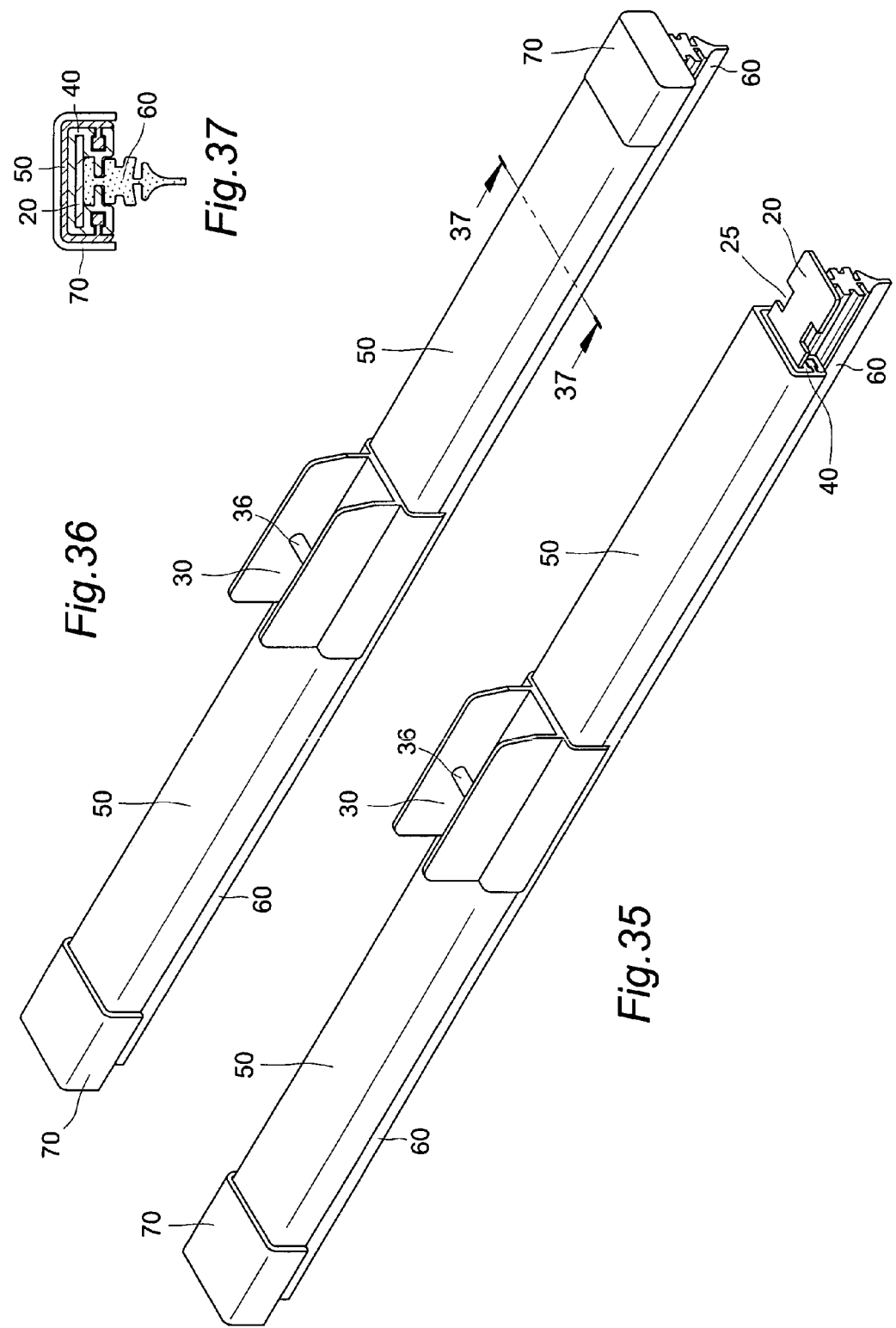

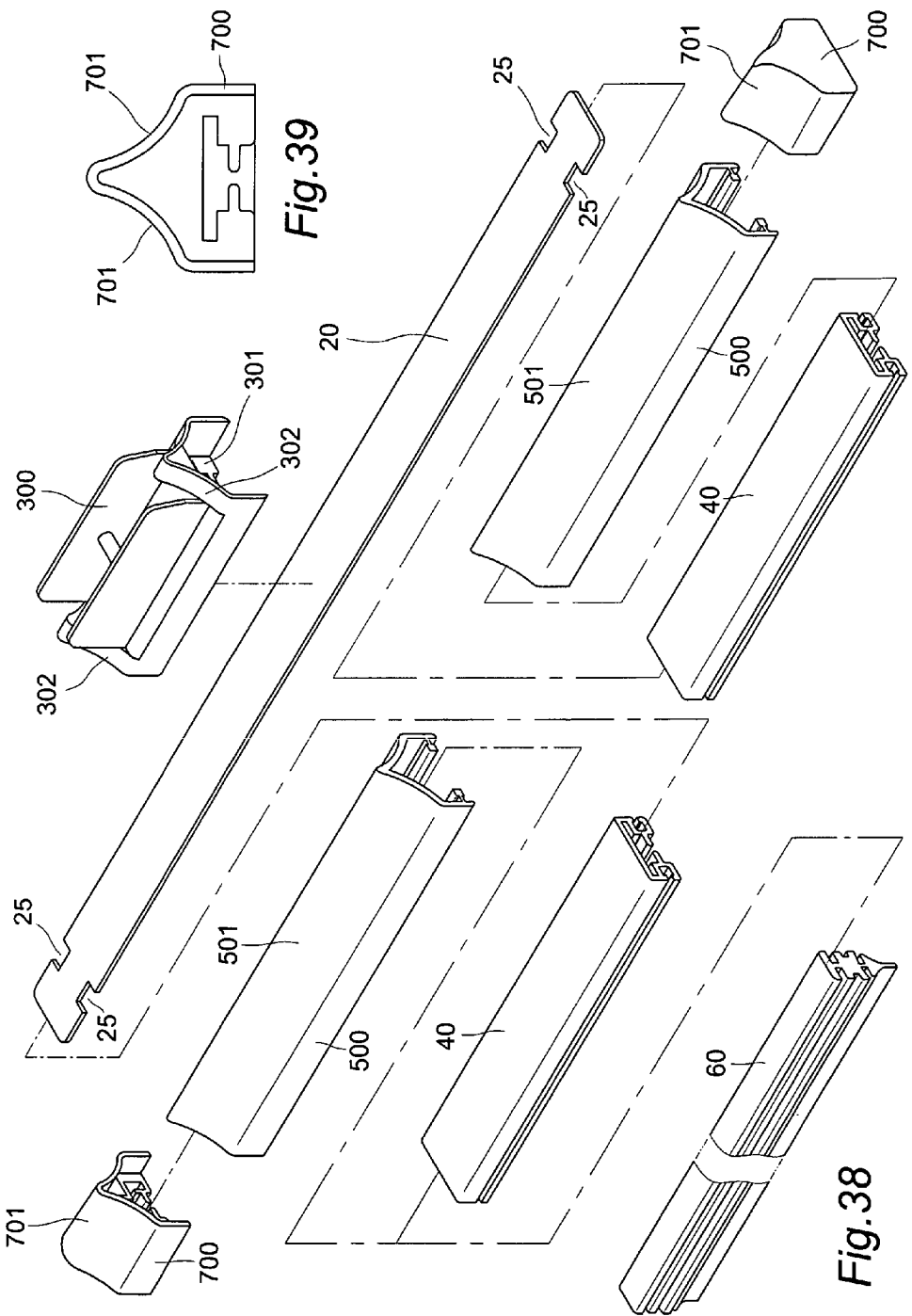

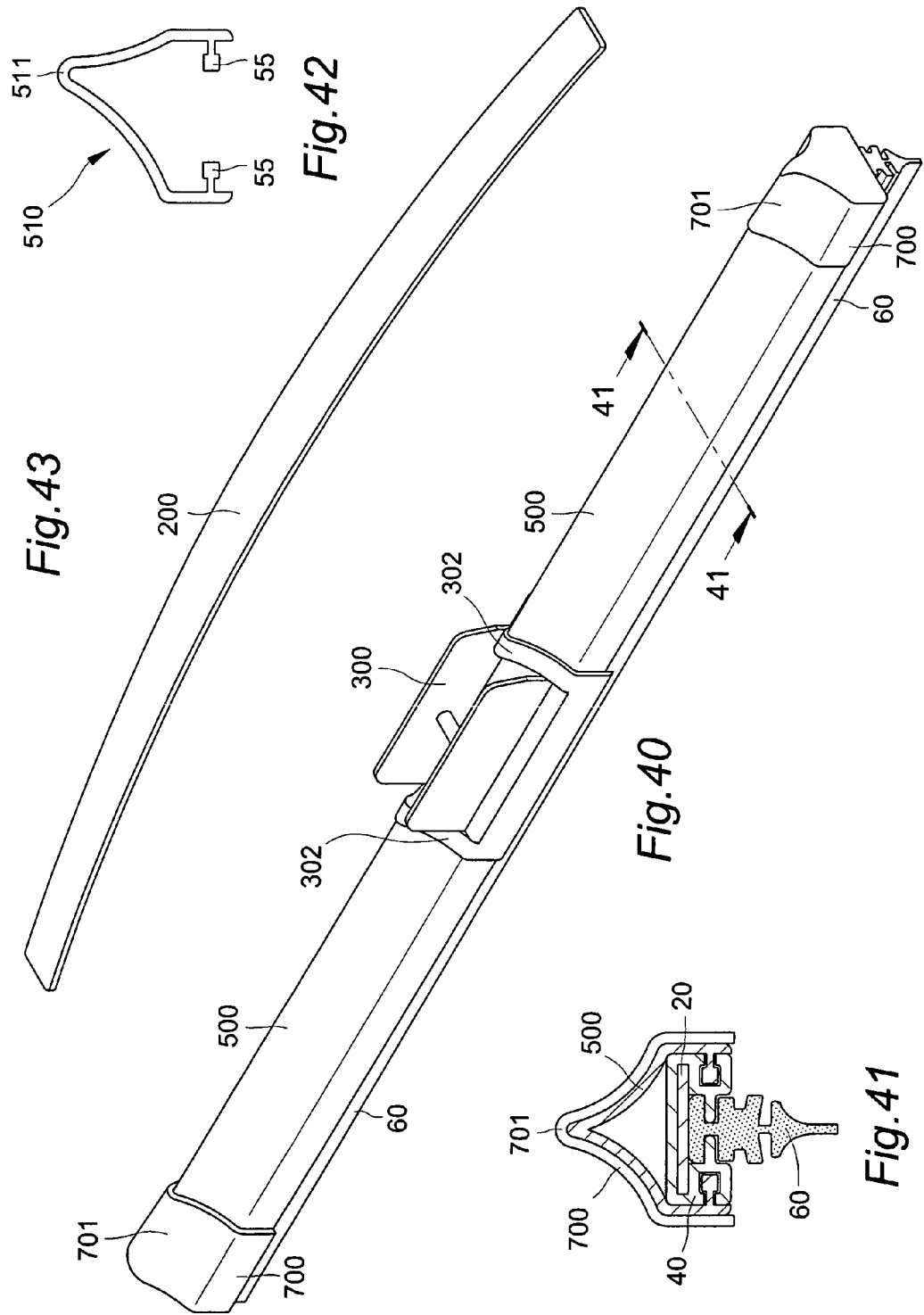

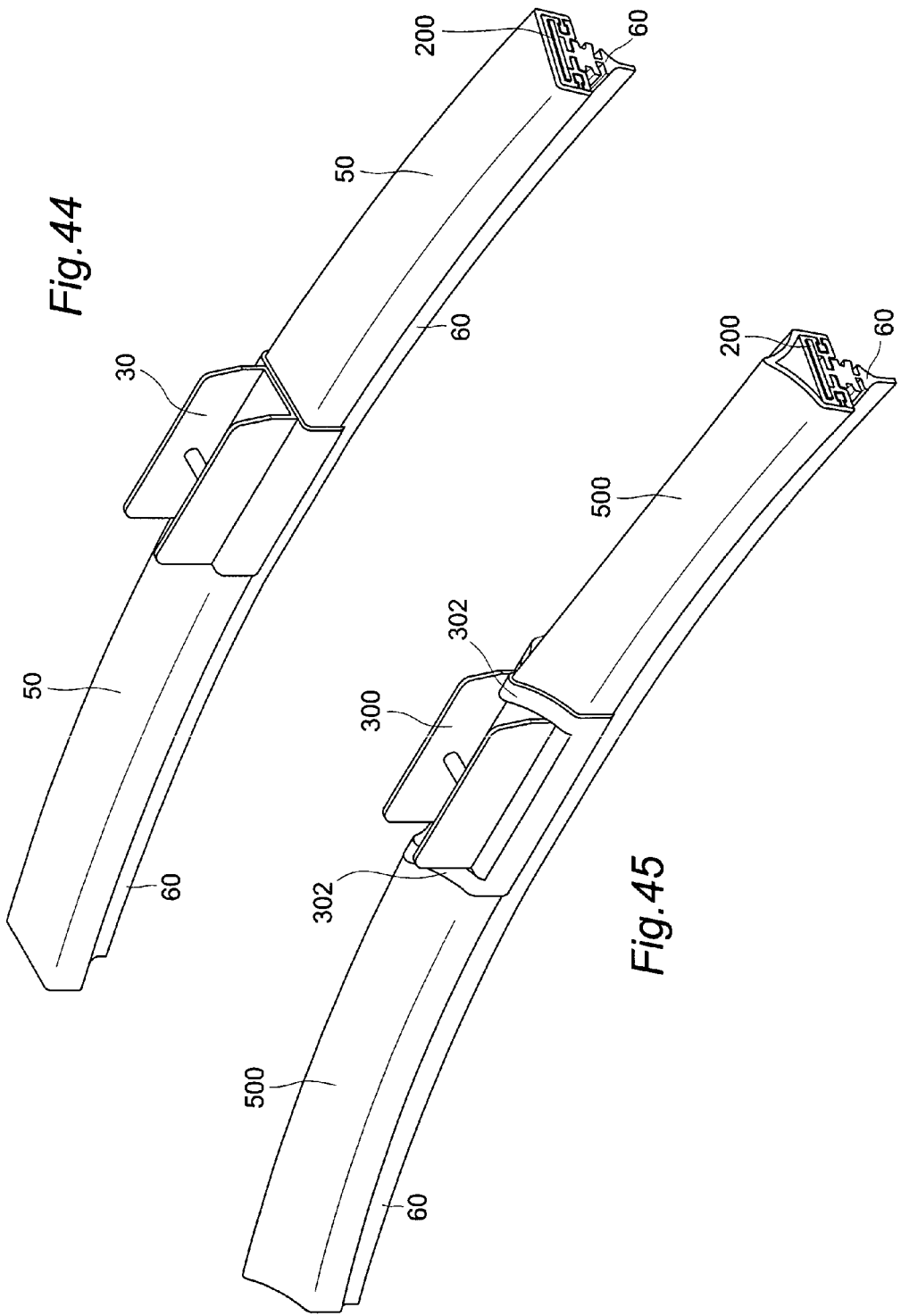

COMBINATIONAL STRUCTURE OF FLAT BLADE WIPER FOR VEHICLE

FIELD OF THE PRESENT INVENTION

The present invention relates to a flat blade wiper for a vehicle, which can be easily and quickly assembled and which improves smooth operation of the wiper so that not only the productivity in mass production but also the competitiveness in marketing promotion is increased due to decreasing in the labor-hour manufacturing cost.

BACKGROUND OF THE INVENTION

The evolution of the windshield wiper for vehicles has progressed from a traditional frame supported wiper into a modern non-framed wiper, colloquially called as flat blade wiper. The frame supported wiper usually includes a U-shaped metal strip called a metal blade frame with a lengthwise slot in the frame for holding a rubber blade to serve as an exposed supporting keel for the associated rubber blade, whereas a flat metal strip for the non-framed wiper is imbedded in a soft elastic clipping sleeve sheath, which actually holds a rubber blade, to serve as an enveloped keelson for the associated rubber blade. Recently, most windshield wipers having been used by the newly marketed vehicles are non-framed wipers. The frame supported wiper have apparently become phased out in the market because it involves more components with heavier weight and more power consumption, and after certain service time is susceptible to corrosion due to weatherworn effects of the exposed metal blade frame. Moreover, the windshield wiper is a consumptive products, requiring replacement when its wiping function declines due to aging which may affect the driving safety. The accumulative quantity of the eliminated defective wipers from annual replaced frame supported wiper might become a heavy burden for the environment protection. Contrarily, there are no such foregoing drawbacks for the non-framed wiper.

Accordingly, various non-framed wipers such as USA utility patents in numbers of U.S. Pat. No. 6,523,218, U.S. Pat. No. 6,944,905, U.S. Pat. No. 7,228,588, U.S. Pat. No. 7,055,206, U.S. Pat. No. 7,305,734, U.S. Pat. No. 7,484,264 and U.S. Pat. No. 7,210,189 as well as USA new design patents in numbers of D430097, D512362, D457479, D443854, D511735, D5644345, D5649555, D5794015 and D5798495 have been developed. Among those non-framed wipers mentioned above, the U.S. Pat. No. 7,210,189 patent disclosed a newest non-framed wiper as shown in FIGS. 1 through 6. As known from the "Detailed Description of Preferred Embodiment of the Present Invention" in the published patent specification, the windshield wiper comprises two blade bodies 6, a flat metal vertebra 7 with rectangular cross section, a rubber element 9 and a central support 10 wherein:

Said blade body 6 consists in a flexible upper support 4 and a semi-rigid lower support 5. Joining the upper support 4 and the lower support 5 by co-extrusion assures the single piece formed an integral support to the other components of the blade system including the metal vertebra 7 and the rubber element 9, in which, said upper support 4 includes a mounting channel 8, passing lengthwise throughout the length of the blade body 6, being preferably rectangular in shape, inside of which the metal vertebra 7 is inserted, also having preferably rectangular and flat profile and shape, being used for securing and keeping the element 9 in uniform contact with the windshield 3, said lower support 5 includes a lower mounting channel 12, passing lengthwise throughout the length of the blade body 6, being preferably rectangular in shape and further provided with a longitudinal rectangular opening 13 extending throughout the blade body 6, in which the rectangular upper section 16 with central neck of the rubber element 9 is inserted through the rectangular upper section 15 and the longitudinal rectangular opening 13 (as shown in FIGS. 1 through 3); and Said central support 10, which is made of metallic or plastic material to be adjusted to the adapter of wiper arm 2 of the windshield wiper 3, comprises an upper mounting channel 11 and a lower passage channel 14 such that said upper mounting channel 11, passing lengthwise throughout the length of the central support 10, being preferably rectangular in shape, and said passage channel 14, passing lengthwise throughout the length of the central support 10, being preferably rectangular in shape inside of which the metal vertebra 7 is inserted, and further provided beneath with a longitudinal rectangular opening 15 extending throughout the sequential central support 10, in which the rectangular upper section 16 of the rubber element 9 is inserted through (as shown in FIGS. 2 and 3).

Please refer to FIGS. 2 through 6, which describes the assembly procedure for the conventional windshield wiper of the prior art in the U.S. Pat. No. 7,210,189 patent. Firstly, pass the mounting channel 11 of the central support 10 through the metal vertebra 7 up to the central position thereof, then fix the central support 10 at the central position of the metal vertebra 7 by bolts or rivets (as shown in FIG. 6); Secondly, insert each end of the metal vertebra 7 into corresponding mounting channel 8 in the upper support 4 of the blade body 6 (as shown in FIG. 4) so that each half of the metal vertebra 7 is enveloped by a blade body 6 (as shown in FIG. 6); and Finally, insert each rectangular upper section 16 of the rubber element 9 into corresponding lower mounting channel 12 and passage channel 14 and the longitudinal rectangular opening 13 and 15 on the blade body 6 and the central support 10 (as shown in FIG. 5), so that the entire windshield wiper is successfully assembled (as shown in FIG. 3).

However, some drawbacks exist in the conventional windshield wiper of the prior art in the U.S. Pat. No. 7,210,189 patent as below:

As shown in FIGS. 7 through 7e, when the rubber element 9 is pushed over the windshield 3 by the wiper arm 2, a normal force component Fv exerts on the blade body 6 so that the wiping edge of the rubber element 9 is tightly pressed against the top surface of the windshield 3 (as shown in FIG. 7); Because the wiper arm 2 swings back and forth during rain, the metal vertebra 7 has a forward horizontal force component Fh exerting on the blade body 6 (as shown in FIG. 7a) upon wiper arm 2 swinging forth, whereas the metal vertebra 7 has a backward horizontal force component Fh' exerting on the blade body 6 (as shown in the hypothetical line of the FIG. 7c) upon wiper arm 2 swinging back; Thereby, action of the forward horizontal force component Fh and the backward horizontal force component Fh' will indirectly apply to the rubber element 9 orderly via the flexible upper support 4 firstly and semi-rigid lower support 5 secondly of the blade body 6 so that the wiping edge of the rubber element 9 will wipe over the top surface of the windshield 3 to achieve the wiping effect. During forward horizontal force component Fh exerting on the blade body 6 by the metal vertebra 7, the right side of the upper mounting channel 8 in the soft flexible upper support 4 of the blade body 6 will be laterally affected by the right side of the metal vertebra 7 in contact pushing manner while the left side of the upper mounting channel 8 will not be laterally affected by the left side of the metal vertebra 7 in detached manner (as shown in FIG. 7a); Because action of the forward horizontal force component Fh and the backward horizontal force component Fh' will indirectly apply to the rubber element 9 orderly via the upper support 4 and lower support 5 of the blade body 6 so that the wiping edge of the rubber element 9 will wipe over the top surface of the windshield 3, therefore, when wiper arm 2 swings forth, the right side of the upper mounting channel 8 in the soft flexible upper support 4 will be deformed in stretchable manner due to squeeze by the by the right side of the metal vertebra 7 while the left side of the upper mounting channel 8 in the soft flexible upper support 4 will be deformed in a gap 8 left between the left side of the upper mounting channel 8 and the left side of the metal vertebra 7 (as shown in FIG. 7b); When wiper arm 2 swings back, the backward horizontal force component Fh' will convert the situation to become that the right side of the upper mounting channel 8 in the soft flexible upper support 4 of the blade body 6 will not be laterally affected by the right side of the metal vertebra 7 in detached manner while the left side of the upper mounting channel 8 will be laterally affected by the left side of the metal vertebra 7 in contact pushing manner (as shown in FIG. 7c and the hypothetical line of the 7d); Likewise, when wiper arm 2 swings back, the left side of the upper mounting channel 8 in the soft flexible upper support 4 will be deformed in stretchable manner due to squeeze by the by the left side of the metal vertebra 7 while the right side of the upper mounting channel 8 in the soft flexible upper support 4 will be deformed in a gap δ' left between the right side of the upper mounting channel 8 and the right side of the metal vertebra 7 (as shown in FIG. 7e).

In other words, both of the deformed gap δ and gap δ' between each of both sides of the upper mounting channel 8 and each of corresponding both sides of the metal vertebra 7 will be alternately created by the forward horizontal force component Fh and backward horizontal force component Fh' from wiper arm 2 swinging back and forth. Consequently, the transmission delay of the exerting force due to both deformed gap δ and gap δ' will cause a delay in temporary wiping pause and jerky phenomena of the rubber element 9 over the top surface of the windshield 3 so that a harsh scraping noise is incurred to spoil the tranquility in the vehicle. Moreover, because the swing frequency of the normal windshield wiper over the vehicle windshield 3 is 40~50 times per minute, namely 2400~3000 times per hour, the foregoing temporary wiping pause and jerky phenomena of the rubber element 9 over the top surface of the windshield 3 will follow in same frequency accordingly. Thus, the service life of the rubber element 9 in the windshield wiper will be shortened under such high frequency of temporary wiping pause and jerky phenomena and result in that the replacing frequency and cost is incurred to increase.

Inspecting and reviewing the foregoing drawbacks in the conventional windshield wiper of the prior art in the U.S. Pat. No. 7,210,189 patent, the primary cause is that the exerting force of the metal vertebra 7 from the wiper arm 2 indirectly apply on the semi-rigid lower support 5 via soft flexible upper support 4 instead of directly applying on the semi-rigid lower support 5. Therefore, the transmission delay of the exerting force due to both deformed gap δ and gap δ' in the soft flexible upper support 4 is inevitable due to deformation susceptible soft flexible material so that a temporary wiping pause or delay with jerky phenomena of the rubber element 9 over the top surface of the windshield 3 is caused consequently. Thus, such bad structural design not only violates the transmission rule in dynamics but also bring bad effects aforesaid for the consumers.

Besides, the upper support 4 is made of soft flexible material while the vertebra 7 including upper mounting channel 8 therein is made of rigid metal so that friction resistance and assembling time are inevitably increased. Consequently, the incurred drawbacks are that the yield of mass production is reduced and the manufacturing cost is increased as well as marketing competition ability is decreased.

SUMMARY OF THE INVENTION

The primary object of the present invention is to provide a combinational structure of flat blade wiper for vehicle, which comprises an elastic metal keelson strip, a saddle bracket of wiper adapter, two clipping sleeve mounts, two external covers, an elongated scraping blade and a pair of end positioning caps as well as externally supplied a wiper adapter and wiper arm, wherein on the saddle bracket and each clipping sleeve mount, an upper accommodating channel and an abutted lower accommodating channel of rectangular cross sections are formed therein respectively such that the upper accommodating channel is inserted by the elastic metal keelson strip while the lower accommodating channel is inserted by the upper wing section of the elongated scraping blade. When the wiper arm sweeps over the windshield for wiping function, all horizontal forces of the wiper arm directly drive the clipping sleeve mount of semi-rigid plastic via rigid elastic metal keelson strip, meanwhile relay to two horizontal clipping juts of the clipping sleeve mount for driving the middle neck section of the elongated scraping blade to achieve the waterscraping effect of the wiper. Thereby, the force transmission is consistent throughout the wiping operation for the windshield wiper of the present invention, so that no delay in temporary wiping pause or jerky phenomena are caused so that the inside calm tranquility state in the vehicle will not be spoiled. Thus, not only can the service life span of the elongated scraping blade be prolonged but also the replacing cost thereof can be considerably reduced owing to a decrease in motive and wearing burdens of the wiper arm.

The other object of the present invention is to provide a combinational structure of flat blade wiper for Vehicle, by means of the accommodating channel of semi-rigid plastic in the clipping sleeve mount, during the elastic metal keelson strip being inserted therein, the friction resistance and the assembling difficulty are decreased so that not only the laborhour manufacturing cost is reduced but also the productivity in mass production is increased.

BRIEF DESCRIPTION OF THE DRAWINGS

FIG. 4 is a first illustration of a perspective assembly view of the conventional windshield wiper shown in U.S. Pat. No. 7,210,189.

FIG. 5 is a second illustration of a perspective assembly view for the conventional windshield wiper shown in U.S. Pat. No. 7,210,189.

FIG. 6 is a third illustration of a perspective assembly view for the conventional windshield wiper shown in U.S. Pat. No. 7,210,189.

FIG. 7 is a first illustration of an operational view for the conventional windshield wiper shown in U.S. Pat. No. 7,210, 189.

FIG. 7*a* is a second illustration of an operational view of the conventional windshield wiper shown in U.S. Pat. No. 7,210,189.

FIG. 7*b* is a third illustration of an operational view of the conventional windshield wiper shown in U.S. Pat. No. 7,210,189.

FIG. 7*c* is a fourth illustration of an operational view of the conventional windshield wiper shown in U.S. Pat. No. 7,210,189.

FIG. 7*d* is a fifth illustration of an operational view of the conventional windshield wiper shown in U.S. Pat. No. 7,210,189.

FIG. 7*e* is a sixth illustration of an operational view of the conventional windshield wiper shown in U.S. Pat. No. 7,210,189.

FIG. 8*a* is an exploded perspective view for a modified saddle bracket of wiper adapter of the above first preferred embodiment of the present invention.

FIG. 12 is the first perspective assembly schematic view of the above first preferred embodiment of the present invention.

FIG. 13 is the second perspective assembly schematic view of the above first preferred embodiment of the present invention.

FIG. 14 is the third perspective assembly schematic view of the above first preferred embodiment of the present invention.

FIG. 15 is the fourth perspective assembly schematic view of the above first preferred embodiment of the present invention.

FIG. 16 is the fifth perspective assembly schematic view of the above first preferred embodiment of the present invention.

FIG. 17 is the sixth perspective assembly schematic view of the above first preferred embodiment of the present invention.

FIG. 18 is a sectional view taken along line 18-18 as indicated in FIG. 17.

FIG. 19 is a perspective schematic view of the above first preferred embodiment of the present invention showing assembly of a wiper adapter with present invention.

FIG. 20 is a perspective schematic view of the above first preferred embodiment of the present invention showing a wiper arm assembled thereon.

FIG. 23 is the first schematic view for an elastic metal keelson strip in another exemplary embodiment of the present invention.

FIG. 24 is the second schematic view for an elastic metal keelson strip in another exemplary embodiment of the present invention.

FIG. 25 is a schematic view for a central clipping sleeve mount in another exemplary embodiment of the present invention.

FIG. 26 is a sectional view taken along line 26-26 as indicated in FIG. 25.

FIG. 27 is an exploded perspective schematic view for an altered exemplary embodiment of the present invention.

FIG. 28 is a sectional view taken along line 28-28 as indicated in FIG. 27.

FIG. 29 is a perspective assembly schematic view for an adapted external cover in an altered exemplary embodiment of the present invention.

FIG. 30 is a sectional view taken along line 30-30 as indicated in FIG. 29.

FIG. 31 is a perspective schematic view for an altered exemplary embodiment of the present invention showing assembly of an adapted external cover with wiper arm.

FIG. 32 is a perspective view showing a pair of additional end positioning caps being further included in the second exemplary embodiment of the present invention.

FIG. 32*a* is a front view of 32*a* in the FIG. 32.

FIG. 32*b* is a sectional view taken along line 32*b*-32*b* as indicated in FIG. 32*a*.

FIG. 33 is a sectional view taken along line 33-33 as indicated in FIG. 32.

FIG. 34 is a perspective schematic view for the second exemplary embodiment of the present invention showing assembly of an elastic metal keelson strip with an end positioning cap.

FIG. 34*a* is the first lateral planar schematic view for the second exemplary embodiment of the present invention showing assembly of an elastic metal keelson strip with an end positioning cap.

FIG. 34*b* is the second lateral planar schematic view for the second exemplary embodiment of the present invention showing assembly of an elastic metal keelson strip with an end positioning cap.

FIG. 34*c* is the third lateral planar schematic view for the second exemplary embodiment of the present invention showing assembly of an elastic metal keelson strip with an end positioning cap.

FIG. 35 is the first perspective assembly schematic view according to a second preferred embodiment of the present invention.

FIG. 36 is the second perspective assembly schematic view according to a second preferred embodiment of the present invention.

FIG. 37 is a sectional view taken along line 37-37 as indicated in FIG. 36.

FIG. 38 is an exploded perspective schematic view according to a third preferred embodiment of the present invention.

FIG. 39 is a lateral planar schematic view of the end positioning cap in third preferred embodiment of the present invention.

FIG. 40 is a perspective assembly schematic view according to a third preferred embodiment of the present invention.

FIG. 41 is a sectional view taken along line 41-41 as indicated in FIG. 40.

FIG. 42 is a sectional schematic view showing a modified external cover for the third exemplary embodiment of the present invention.

FIG. 43 is a perspective view for the fourth exemplary embodiment of the present invention showing an adapted elastic metal keelson strip.

FIG. 44 is the first perspective schematic view for the fourth exemplary embodiment of the present invention showing an adapted elastic metal keelson strip assembled therein.

FIG. 45 is the second perspective schematic view for the fourth exemplary embodiment of the present invention showing an adapted elastic metal keelson strip assembled therein.

DETAILED DESCRIPTION OF THE PREFERRED EMBODIMENTS

Figure 3:
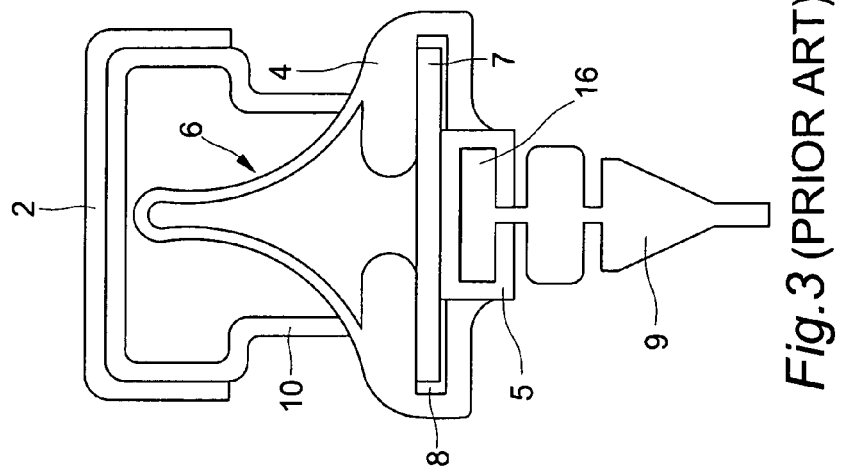
FIG. 3 is an assembly view of the conventional windshield wiper shown in U.S. Pat. No. 7,210,189.
Figure 2:
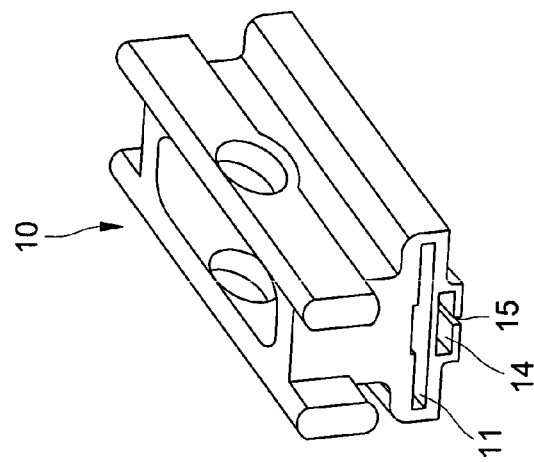
FIG. 2 is a perspective view of a central support for the conventional windshield wiper of U.S. Pat. No. 7,210,189.
Figure 1:
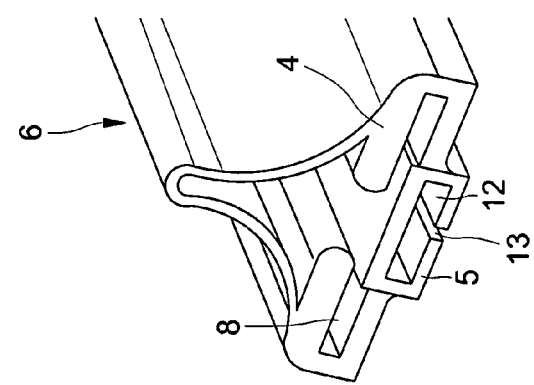
FIG. 1 is a perspective view of a blade body for the conventional windshield wiper of U.S. Pat. No. 7,210,189.
Figure 8:
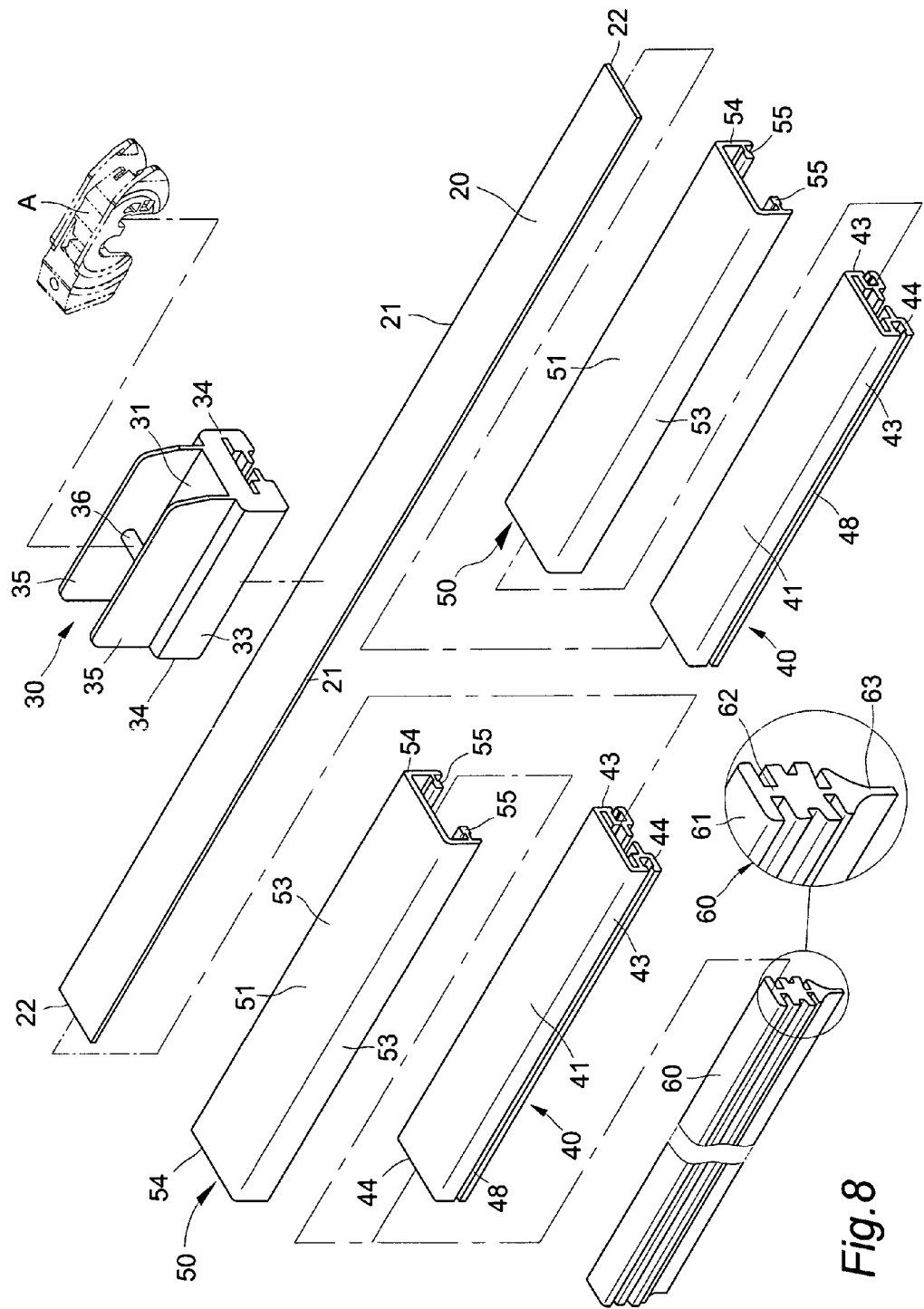
FIG. 8 is an exploded perspective view of a combinational structure of flat blade wiper according to a first preferred embodiment of the present invention.
Figure 9:
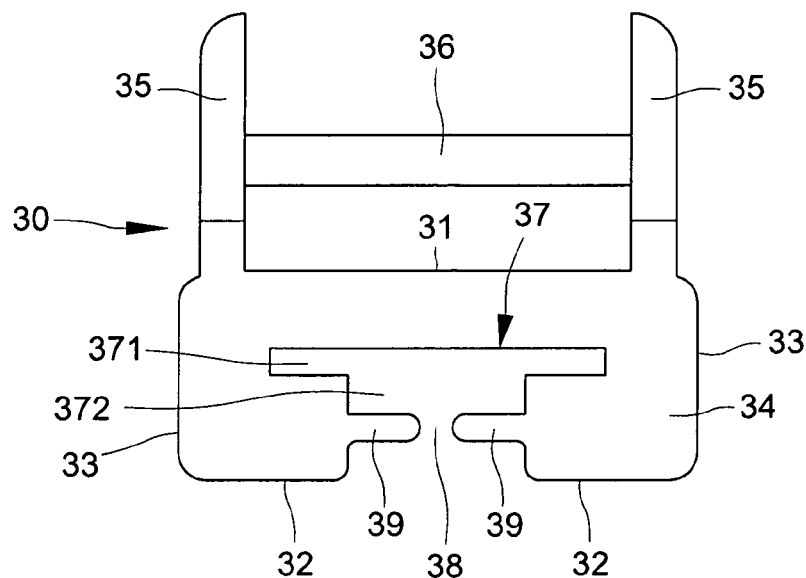
FIG. 9 is a lateral view for a saddle bracket of wiper adapter of the above first preferred embodiment of the present invention.
Figure 10:
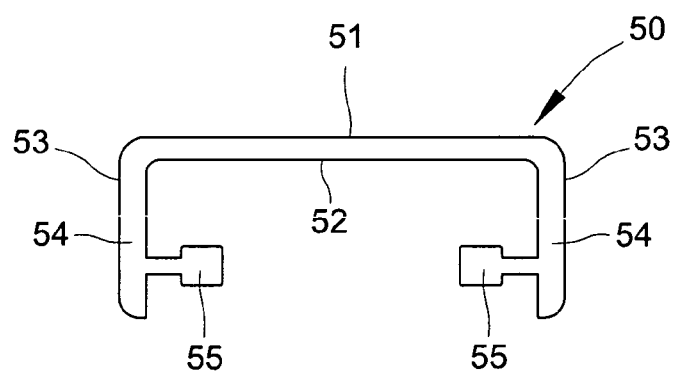
FIG. 10 is a lateral view for an external cover of the above first preferred embodiment of the present invention.
Figure 11:
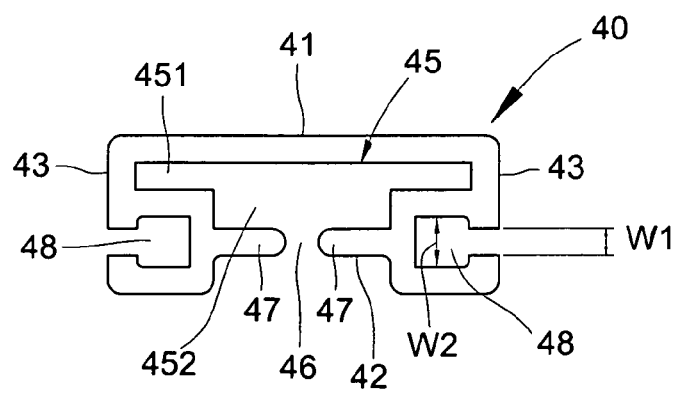
FIG. 11 is a lateral view for a clipping sleeve mount of the above first preferred embodiment of the present invention.

Please refer to FIGS. 8 through 11, 14 and 20. The non-framed windshield wiper, colloquially called as flat blade wiper according to a first preferred embodiment of the present invention comprises an elastic metal keelson strip 20, a saddle bracket of wiper adapter 30, two clipping sleeve mounts 40, two external covers 50 and an elongated scraping blade 60 as well as externally supplied a wiper adapter A and wiper arm 2, wherein:

Said elastic metal keelson strip 20, which is a straight flat flexible metal band of rectangular cross sectional shape profile, has a pair of parallel long lengthwise edges 21 and a pair of parallel short transverse edges 22;

Said saddle bracket of wiper adapter 30, which is a unitary extruded plastic adapted parallelepiped member for mounting over the center of the elastic metal keelson strip 20, has a top surface 31, a bottom sole 32, two long lengthwise shoulders 33 and two short transverse sides 34, wherein: A pair of upright cheeks 35 are juxtaposed on the top surface 31, a supporting spindle 36 is configured between two upright cheeks 35 for coupling to the wiper adapter A (as indicated by hypothetical line shown in FIG. 8) in securely linking to the end of the wiper arm 2 (as shown in FIG. 20); An accommodating channel 37, which is created between two long lengthwise shoulders 33 in parallel manner to run through both short transverse sides 34, contains an upper accommodating channel 371 of big rectangular cross section formed near the top surface 31 thereof and an abutted lower accommodating channel 372 of small rectangular cross section formed near the bottom sole 32 thereof such that the upper accommodating channel 371 is designed into wide rectangular cross sectional shape profile to be inserted by the elastic metal keelson strip 20 in tolerance fashion of transition fit or Interference fit while the lower accommodating channel 372 is designed into narrow rectangular cross sectional shape profile to be inserted by an upper wing section 61 of the elongated scraping blade 60; A longitudinal gap 38 is created between the lower accommodating channel 372 and the bottom sole 32 to parallel with two long lengthwise shoulders 33, and a pair of horizontal clipping juts 39 are created between the internal wall of the lower accommodating channel 372 to abut against both sides of the longitudinal gap 38 and extending in parallel to a plane of the bottom sole 32 (as shown in FIG. 9) so that a middle neck section 62 of the elongated scraping blade 60 can be inserted into therein;

Each of said two clipping sleeve mount 40, which is a unitary extruded semi-rigid plastic adapted hollow band for sleeving over the elastic metal keelson strip 20 (as shown in FIG. 14), has a top surface 41, a bottom sole 42, and two long lengthwise shoulders 43 as well as two short transverse sides 44, wherein: An accommodating channel 45, which is created between two long lengthwise shoulders 43 in parallel manner to run through both short transverse sides 44, contains an upper accommodating channel 451 of big rectangular cross section formed near the top surface 41 thereof and an abutted lower accommodating channel 452 of small rectangular cross section formed near the bottom sole 42 thereof such that the upper accommodating channel 451 is designed having a wide rectangular shaped cross section to be inserted by the elastic metal keelson strip 20 in tolerance fashion of transition fit or Interference fit while the lower accommodating channel 452 is designed having a narrow rectangular shaped cross section to be inserted by the upper wing section 61 of the elongated scraping blade 60; A longitudinal gap 46 is created between the lower accommodating channel 452 and the bottom sole 42 to parallel with two long lengthwise shoulders 43, a pair of horizontal clipping juts 47 are created between the internal wall of the lower accommodating channel 452 to abut against both sides of the longitudinal gap 46 and extending in parallel to a plane of the bottom sole 42 so that the middle neck section 62 of the elongated scraping blade 60 can be inserted into therein, and a lateral elongated groove 48 is inwardly created in each long lengthwise shoulder 43 in parallel manner respectively to run through both short transverse sides 44 such that its gap width W1 is smaller than its internal width W2 (as shown in FIG. 10);

Each of said two external cover 50, which is a unitary extruded soft plastic adapted inverted U shaped hollow band to envelop over the top surface 41 and two long lengthwise shoulders 43 of the two clipping sleeve mounts 40, has a top surface 51, a bottom sole 52 and two long lengthwise shoulders 53 as well as two short transverse sides 54, wherein a pair of parallel protruding docking bars 55 are juxtaposed on internal walls of two long lengthwise shoulders 53 (as shown in FIG. 11) such that whose cross sectional shape is same as that of the lateral elongated grooves 48 in the clipping sleeve mount 40 but the peripheral size thereof is slightly smaller than that of the lateral elongated grooves 48 so that each protruding docking bar 55 can suitably insert into each corresponding lateral elongated grooves 48 respectively with secure confinement of the width W1 without any possibility of detaching off; and Said elongated scraping blade 60, which is a unitary extruded soft resilient adapted band to be clipped inside two horizontal clipping juts 47 of the clipping sleeve mount 40 and the horizontal clipping juts 39 of central saddle bracket of wiper adapter 30, has an upper wing section 61, a middle neck section 62, and a lower scraping edge 63 with tapering tip formed at bottom side, wherein said middle neck section 62 juxtaposes a pair of symmetric longitudinal grooves inwardly formed on both sides thereof.

Further refer to FIGS. 12 through 18, which describe the assembly procedure for the first exemplary embodiment of the present invention in stepwise manner as below:

(a). Align the upper accommodating channel 371 of the accommodating channel 37 in any short transverse side 34 of the saddle bracket of wiper adapter 30 with one short transverse edges 22 of the elastic metal keelson strip 20 to start to sleeve the saddle bracket of wiper adapter 30 over the elastic metal keelson strip 20, then inwardly slide the saddle bracket of wiper adapter 30 forwards up to the center of the elastic metal keelson strip 20 such that the upper accommodating channel 371 is filled by the elastic metal keelson strip 20, and the lower accommodating channel 372 is beneath the bottom side of the elastic metal keelson strip 20 now (as shown in FIG. 12).

(b). Align the upper accommodating channel 451 of the accommodating channel 45 in any short transverse side 44 of the clipping sleeve mount 40 with one short transverse edges 22 of the elastic metal keelson strip 20 to start to sleeve the clipping sleeve mount 40 over the elastic metal keelson strip 20, then inwardly slide the clipping sleeve mount 40 forwards until the front short transverse side 44 thereof touches the facing short transverse sides 34 of the centered saddle bracket of wiper adapter 30 such that the upper accommodating channel 451 is filled by the elastic metal keelson strip 20, and the lower accommodating channel 452 is beneath the bottom side of the elastic metal keelson strip 20 now (as shown in FIGS. 13 and 18).

(c). Likewise in step b, sleeve the other clipping sleeve mount 40 over the elastic metal keelson strip 20 from other end thereof in same manner (as shown in FIG. 14).

(d). Align pair protruding docking bars 55 on the inside long lengthwise shoulders 53 in any short transverse side 54 of the external cover 50 with one pair lateral elongated grooves 48 in the long lengthwise shoulders 43 of the clipping sleeve mount 40 to start to insert the external cover 50 over the clipping sleeve mount 40, then inwardly slide the external cover 50 forwards until the front short transverse side 54 thereof touches the facing short transverse sides 34 of the centered saddle bracket of wiper adapter 30 (as shown in FIG. 15); Likewise, sleeve the other external cover 50 over the clipping sleeve mount 40 from other end thereof in same manner (as shown in FIG. 16).

(e). Simultaneously align the upper wing section 61 and middle neck section 62 of the elongated scraping blade 60 with the lower accommodating channel 452 and the pair horizontal clipping juts 47 of the clipping sleeve mount 40 respectively from any common end of combined clipping sleeve mount 40 and external cover 50 with elastic metal keelson strip 20 enveloped therein to start to insert the elongated scraping blade 60 inwardly; Then, inwardly slide the elongated scraping blade 60 forwards to orderly pass front clipping sleeve mount 40, central saddle bracket of wiper adapter 30 and the other rear clipping sleeve mount 40 until both ends of the elongated scraping blade 60 flush with both common ends of the combined clipping sleeve mount 40 and external cover 50 with elastic metal keelson strip 20 enveloped therein to finish entire assembling process for the integral finished product (as shown in FIGS. 17 and 18); At this moment, the upper wing section 61 of the elongated scraping blade 60 is sheathed by two lower accommodating channels 452 of the clipping sleeve mounts 40 and the lower accommodating channel 372 of the central saddle bracket of wiper adapter 30 while the middle neck section 62 of the elongated scraping blade 60 is supported by two pair horizontal clipping juts 47 of the clipping sleeve mounts 40 and the horizontal clipping juts 39 of the central saddle bracket of wiper adapter 30 so that firm securing mount of the elongated scraping blade 60 in the present invention is reinforced.

Wherein, before the saddle bracket of wiper adapter 30 being sleeved over the elastic metal keelson strip 20 in above step a, certain bonding resin can be coated on the central portion of the elastic metal keelson strip 20 so that the fitting strength between the saddle bracket of wiper adapter 30 and elastic metal keelson strip 20 can be enhanced. And, because the fitting tolerance between the upper accommodating channel 451 of the clipping sleeve mount 40 and the elastic metal keelson strip 20 is transition fit or Interference fit in above steps b and c, no detaching instance of them will happen possibly. Moreover, the soft plastic of the protruding docking bar 55 in the external cover 50 can be replaced by rigid plastic such that both of the protruding docking bar 55 and external cover 50 can be combined for unitary extruding process into an integral body, then In step d, the sliding process of such rigid protruding docking bars 55 into two lateral elongated grooves 48 in the clipping sleeve mount 40 becomes easier due to less friction resistance. Thereby, the overall laboring hour cost will be reduced in consequence of assembling time in this step d is decreased.

Please refer to FIGS. 19 through 22. After latching the wiper adapter A with the supporting spindle 36 of the saddle bracket of wiper adapter 30 (as shown in FIG. 19), the wiper arm 2 can be linked with the integral body of the wiper adapter A and saddle bracket of wiper adapter 30 in articulation manner (as shown in FIG. 20).

Figure 21:
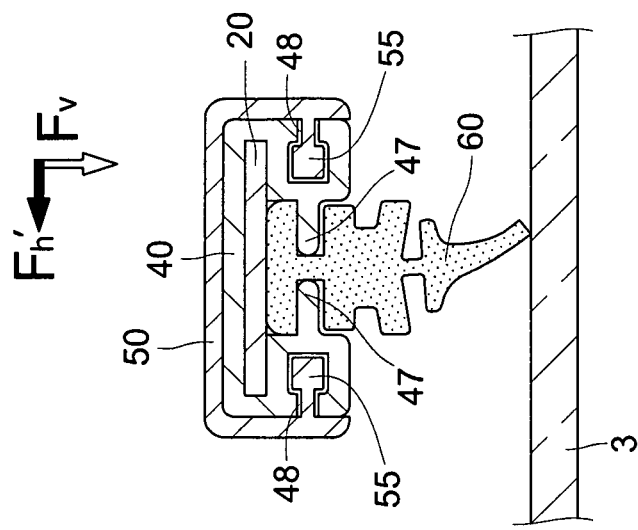
FIG. 21 is the first operational schematic view of the above first preferred embodiment of the present invention showing the present invention working on a windshield.
Figure 22:
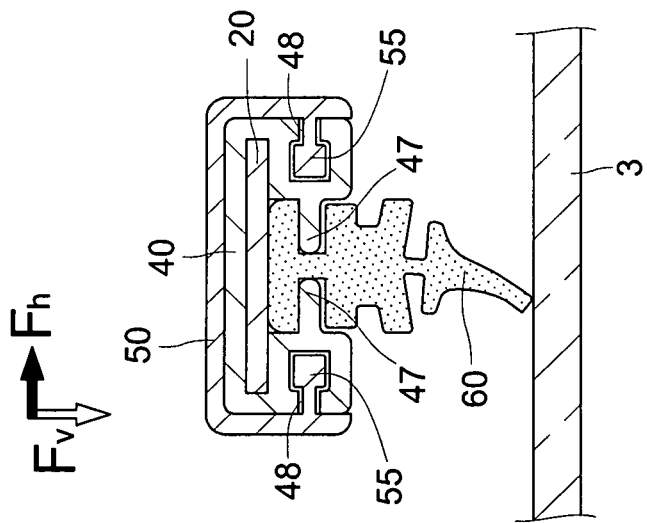
FIG. 22 is the second operational schematic view of the above first preferred embodiment of the present invention showing the present invention working on a windshield.

Please refer to FIGS. 19 through 22. When the wiper arm 2 sweeps over the windshield 3 for wiping function, a forward horizontal force component Fh of the wiper arm 2 (as shown in FIG. 21) and a backward horizontal force component Fh' of the wiper arm 2 (as shown in FIG. 22) directly drive the clipping sleeve mount 40 of semi-rigid plastic via rigid elastic metal keelson strip 20, meanwhile relay to two horizontal clipping juts 47 of the clipping sleeve mount 40 for driving the middle neck section 62 of the elongated scraping blade 60 to achieve the water-scraping effect of the wiper. Thereby, the force transmission throughout the wiping operation for the windshield wiper of the present invention, no delay in temporary wiping pause or jerky phenomena happen as in the conventional windshield wiper of U.S. Pat. No. 7,210,189 patent so that the inside calm tranquility state in the vehicle will not be spoiled. Thus, not only the service life span of the elongated scraping blade 60 can be prolonged but also the replacing cost thereof can be considerably reduced owing to motive and wearing burdens of the wiper arm 2 are decreased.

Please refer to FIGS. 23 and 24. Two corners for each short transverse edge 22 of the elastic metal keelson strip 20 can be trimmed into rounded corners 23 (as shown in FIG. 23) or chamfered into beveled corners 24 (as shown in FIG. 24) as an improved leader to expedite the aligning and sleeving assembly for the clipping sleeve mounts 40 and saddle bracket of wiper adapter 30 over the elastic metal keelson strip 20 in above steps a, b and c.

Please refer to FIG. 8a. A slotted docking inlet 341 with internal front edge cutaway opening section is further inwardly created in each short transverse sides 34 of the saddle bracket of wiper adapter 30 such that its peripheral cross sectional profile is similar to that for the short transverse sides 54 of the external cover 50 but its internal size is slightly bigger than the external size for the short transverse sides 54 of the external cover 50 so that it can achieve the function in totally wrapping over the external cover 50 in above step d.

Please refer to FIGS. 25 and 26. Plural transverse grooves 49 are further formed in the top surface 41 of the clipping sleeve mount 40 to enhance the flexibility of the clipping sleeve mount 40 together with the elastic metal keelson strip 20 in above steps b and c so that the attaching and contacting degree of the windshield wiper 1 over windshields with different curvatures can be suitably adapted to satisfactory condition.

Please refer to FIGS. 27 through 31. The cross sectional profile for the top surface of the external cover 50 in the present invention is further adapted into a longitudinal ridge 56 with tapering tip so as to have air spoiling effect during wiping operation of the elongated scraping blade 60 (as shown in FIG. 28). In according with the adapted longitudinal ridge 56, each short transverse side 34 of the saddle bracket of wiper adapter 30 is further adapted to create a corresponding hollow ridge frame 342 (as shown in FIG. 27) such that its peripheral cross sectional profile is similar to that for the short transverse side 54 of the longitudinal ridge 56 but its internal size is slightly bigger than the external size for the short transverse side 54 of the longitudinal ridge 56 so that it can achieve the function in totally wrapping over the longitudinal ridge 56 other than the air spoiling effect (as shown in FIGS. 29 through 31).

Please refer to FIGS. 32 and 37, which show a pair of additional end positioning caps 70 being further included in the second exemplary embodiment of the present invention. Each end positioning cap 70, which is a unitary extruded plastic element, comprises a top surface 71, a bottom sole 72, a front opening end 73, a rear closed end 74 and two longitudinal shoulders 75, wherein a slotted docking inlet 76 with internal front edge cutaway opening section is further inwardly created in the front opening end 73 facing towards the rear closed end 74 such that its peripheral cross sectional profile is similar to that for the external cover 50 but its internal size is slightly bigger than the external size of the external cover 50; a holding tunnel 77 of rectangular cross sectional profile is inwardly created further inside beneath the bottom end of the slotted docking inlet 76; a pair of horizontal internal knurls 78 is protruding juxtaposed at suitable position on both internal lateral walls of the holding tunnel 77 (as shown in FIG. 32*b*); and an elastic longitudinal slit 79 is created in parallel with longitudinal shoulders 75 along the central line for the wall of the holding tunnel 77 up near to the bottom sole 72 (as shown in FIGS. 32*a* and 32*b*). In according with the additional end positioning caps 70, each end of the elastic metal keelson strip 20 are further adapted to an extra section with a corresponding pair notches 25 inwardly created on both extra long lengthwise edges 21 (as shown in FIG. 34) such that each pair notches 25 can be exactly latched by the corresponding pair horizontal internal knurls 78 upon each end positioning cap 70 suitably capping on each corresponding end for the extra section of the elastic metal keelson strip 20, wherein the length of the extra section for each end of the elastic metal keelson strip 20 equals internal holding length of the holding tunnel 77 in the end positioning cap 70; Besides, the elastic metal keelson strip 20 is also prolonged to as long as the adapted elastic metal keelson strip 20 likewise.

Further refer to FIGS. 34 through 37, which describe the assembly procedure for the second exemplary embodiment of the present invention in curtailed manner as below: Having followed foregoing steps a through e as described in the assembly procedure for the first exemplary embodiment of the present invention, the semi-assembled product is same as that integral product shown in FIG. 35 without end positioning cap 70 such that both ends thereof having extra sections of elastic metal keelson strip 20 and elongated scraping blade 60 exposed like front side near to the reader. Firstly, align the holding tunnel 77 in the front opening end 73 of the end positioning cap 70 with one short transverse edge 22 of the elastic metal keelson strip 20 for starting to sleeve the end positioning cap 70 over two long lengthwise edges 21 of the elastic metal keelson strip 20, then inwardly slide the end positioning cap 70 forwards over the elastic metal keelson strip 20 until both horizontal internal knurls 78 in the holding tunnel 77 touch two rounded corners 23 on the short transverse edge 22 (as shown in FIG. 34*a*); Secondly, apply strength to inwardly push the end positioning caps 70 forwards to force two longitudinal shoulders 75 of the end positioning cap 70 being outwardly deformed in stretched manner by the flexibility of the elastic longitudinal slit 79 (as shown in FIG. 34*b*); Thirdly, continuously inwardly push the end positioning cap 70 forwards until both horizontal internal knurls 78 of the end positioning cap 70 latch in both notches 25 on the elastic metal keelson strip 20 with snap sound (as shown in FIG. 34*c*) to finish the coupling assembly between one end positioning cap 70 and one end of the elastic metal keelson strip 20 (as shown in FIG. 35); and Finally, likewise, cap the other end positioning caps 70 over the other end of the elastic metal keelson strip 20 in same way as described above to finish the overall coupling assembly between the end positioning cap 70 and the elastic metal keelson strip 20 (as shown in FIGS. 36 and 37). Thereby, both end positioning caps 70 have enhanced effect for securely holding two clipping sleeve mounts 40, two external covers 50 and the elongated scraping blade 60 with the elastic metal keelson strip 20 together.

Please refer to FIGS. 38 and 41, which is the third exemplary embodiment of the present invention. Wherein, the cross sectional profile for the top surface of the external cover 500 in this embodiment is further adapted into a longitudinal ridge 501 with tapering tip so as to have air spoiling effect during wiping operation of the elongated scraping blade 60 (as shown in FIG. 38). In according with the adapted longitudinal ridge 501, each short transverse sides 301 of the saddle bracket of wiper adapter 300 is further adapted to create a corresponding hollow ridge frame 302, meanwhile a hollow ridge portion 701 with tapering tip of cross sectional profile is also created on the top surface of the end positioning caps 700 such that the peripheral cross sectional profile of the hollow ridge portion 701 is similar to that of the hollow ridge frame 302 but the internal size of the hollow ridge portion 701 is slightly bigger than the external size of the hollow ridge frame 302 (as shown in FIG. 41).

Please refer to FIG. 42, which shows a modified external cover 510 for the third exemplary embodiment of the present invention. Wherein, the cross sectional profile for the top surface of the external cover 510 in this embodiment is further adapted into an asymmetric longitudinal ridge 511 with uneven cambered tapering tip so as to have air spoiling effect during wiping operation of the elongated scraping blade 60.

Please refer to FIGS. 43 and 45, which show an adapted elastic metal keelson strip 20 for the fourth exemplary embodiment of the present invention. Wherein, the elastic metal keelson strip 200 is further adapted into bow-like shape band of rectangular cross sectional profile with two ends extending downwardly so that the pressing strength of the elongated scraping blade 60 over windshields can be enhanced to improve the water scraping and dirt wiping effects.

What is claimed is:

1. A flat blade wiper, comprising:
an elastic metal keelson strip;
a saddle bracket of a wiper adapter;
two clipping sleeve mounts;
two external covers; and
an elongated scraping blade,
wherein said elastic metal keelson strip is a straight flat flexible metal band of rectangular shaped cross section, has a pair of parallel long lengthwise edges and a pair of parallel short transverse edges,
wherein said saddle bracket of wiper adapter is mounted over the center of the elastic metal keelson strip, and serves as a linking articulation for the wiper arm after having coupled the wiper adapter,
wherein each said clipping sleeve mount is a unitary extruded semi-rigid plastic adapted hollow band for sleeving over the elastic metal keelson strip, has a top surface, a bottom sole, and two long lengthwise shoulders as well as two short transverse sides, wherein an accommodating channel, which is created between the two long lengthwise shoulders in a parallel manner to run through both short transverse sides, contains an upper accommodating channel of a big rectangular cross section formed near the top surface thereof and an abutted lower accommodating channel of a small rectangular cross section formed near the bottom sole thereof; a longitudinal gap is created between the lower accommodating channel and the bottom sole to parallel with two long lengthwise shoulders, a pair of horizontal clipping juts are created between the internal wall of the lower accommodating channel to abut against both sides of the longitudinal gap and extending in parallel to a plane of the bottom sole, and a lateral elongated groove is inwardly created in each long lengthwise shoulder in a parallel manner respectively to run through both short transverse sides such that its gap width is smaller than its internal width;

wherein each said external cover is a unitary extruded soft plastic adapted inverted U shaped hollow band to envelop over the surface of the two clipping sleeve mounts, has a top surface, a bottom sole and two long lengthwise shoulders as well as two short transverse sides, wherein a pair of parallel protruding docking bars are juxtaposed on internal walls of a two long lengthwise shoulders; and wherein said elongated scraping blade is a unitary extruded soft resilient adapted band to be clipped inside two horizontal clipping juts of the clipping sleeve mount, has an upper wing section, a middle neck section, and a lower scraping edge with a tapering tip formed at a bottom side, wherein said middle neck section juxtaposes a pair of symmetric longitudinal grooves inwardly formed on both sides thereof.

2. A flat blade wiper as claimed in claim 1, wherein said saddle bracket of wiper adapter, which is a unitary extruded plastic adapted parallelepiped member having a top surface, a bottom sole, two long lengthwise shoulders and two short transverse sides, wherein a pair of upright cheeks are juxtaposed on the top surface, a supporting spindle is configured between the two upright cheeks; an accommodating channel, which is created between the two long lengthwise shoulders in parallel manner to run through both short transverse sides, contains an upper accommodating channel of a big rectangular cross section formed near the top surface thereof and an abutted lower accommodating channel of a small rectangular cross section formed near the bottom sole thereof; a longitudinal gap is created between the lower accommodating channel and the bottom sole to parallel with the two long lengthwise shoulders, and a pair of horizontal clipping juts are created between the internal wall of the lower accommodating channel to abut against both sides of the longitudinal gap and the bottom sole in parallel juxtaposition with suspended in midair manner.

3. A flat blade wiper as claimed in claim 2, wherein a slotted docking inlet with an internal front edge cutaway opening section is further inwardly created in each short transverse sides of the saddle bracket of the wiper adapter such that its peripheral cross sectional profile is similar to that for the short transverse sides of the external cover but its internal size is slightly bigger than the external size for the short transverse sides of the external cover.

4. A flat blade wiper as claimed in claim 2, wherein each said short transverse side of the saddle bracket of wiper adapter is further adapted to create a hollow ridge frame such that its peripheral cross sectional profile is similar to that for the short transverse side of the longitudinal ridge but its internal size is slightly bigger than the external size for the short transverse side of the longitudinal ridge.

5. A flat blade wiper as claimed in claim 1, wherein each said protruding docking bar in the external cover is made of rigid plastic to be combined with the external cover for unitary extruding process into an integral body such that whose cross sectional shape is same as that of the lateral elongated grooves in the clipping sleeve mount but the peripheral size thereof is slightly smaller than that of the lateral elongated grooves.

6. A flat blade wiper as claimed in claim 1, wherein two end positioning caps are further included, and each said end positioning cap, which is a unitary extruded plastic element to securely cap over the short transverse edge of the elastic metal keelson strip, comprises a top surface, a bottom sole, a front opening end, a rear closed end and two longitudinal shoulders, wherein a slotted docking inlet with an internal front edge cutaway opening section is further inwardly created in the front opening end facing towards the rear closed end such that its peripheral cross sectional profile is similar to that for the external cover but its internal size is slightly bigger than the external size of the external cover; a holding tunnel of rectangular cross sectional profile is inwardly created further inside beneath the bottom end of the slotted docking inlet; and an elastic longitudinal slit is created in parallel with longitudinal shoulders along the central line for the wall of the holding tunnel up near to the bottom sole.

7. A flat blade wiper as claimed in claim 1, wherein two corners for each said short transverse edge of the elastic metal keelson strip are trimmed into rounded corners or chamfered into beveled corners.

8. A flat blade wiper as claimed in claim 1, wherein said elastic metal keelson strip is further adapted into bow-like shape band of rectangular cross sectional profile with two ends extending downwardly.

9. A flat blade wiper as claimed in claim 1, wherein on the top surface of each said clipping sleeve mount, plural transverse grooves are further formed therein.

10. A flat blade wiper as claimed in claim 1, wherein the cross sectional profile for the top surface of said external cover is further adapted into a central symmetric longitudinal ridge with a tapering tip.

11. A flat blade wiper as claimed in claim 10, wherein the cross sectional profile of the longitudinal ridge for the top surface of said external cover is further adapted into an asymmetric longitudinal ridge.

12. A flat blade wiper, comprising:
an elastic metal keelson strip;
a saddle bracket of a wiper adapter;
two clipping sleeve mounts;
two external covers;
an elongated scraping blade; and
a pair of end positioning caps,
wherein said elastic metal keelson strip, which is a straight flat flexible metal band of rectangular shaped cross section, has a pair of parallel long lengthwise edges, a pair of parallel short transverse edges and a pair of notches being inwardly created on both extra long lengthwise edges near each short transverse edges thereof;
wherein said saddle bracket of wiper adapter is a unitary extruded plastic adapted parallelepiped member for mounting over the center of the elastic metal keelson strip, has a top surface, a bottom sole, two long lengthwise shoulders and two short transverse sides, wherein a pair of upright cheeks are juxtaposed on the top surface, a supporting spindle is configured between the two upright cheeks for serving as a linking articulation for the wiper arm after having coupled the wiper adapter; an accommodating channel, which is created between two long lengthwise shoulders in parallel manner to run through both short transverse sides, contains an upper accommodating channel of big rectangular cross section formed near the top surface thereof and an abutted lower accommodating channel of small rectangular cross section formed near the bottom sole thereof; a longitudinal gap is created between the lower accommodating channel and the bottom sole to parallel with two long lengthwise shoulders; and a pair of horizontal clipping juts are created between the internal wall of the lower accommodating channel to abut against both sides of the longitudinal gap and the bottom sole in parallel juxtaposition with suspended in midair manner;
wherein each said clipping sleeve mount is a unitary extruded rigid plastic adapted hollow band for sleeving over the elastic metal keelson strip, has a top surface, a bottom sole, and two long lengthwise shoulders as well as two short transverse sides, wherein plural transverse grooves are further formed in the top surface thereof; an accommodating channel, which is created between two long lengthwise shoulders in a parallel manner to run through both short transverse sides, contains an upper accommodating channel of a big rectangular cross section formed near the top surface thereof and an abutted lower accommodating channel of a small rectangular cross section formed near the bottom sole thereof; a longitudinal gap is created between the lower accommodating channel and the bottom sole to parallel with two long lengthwise shoulders, a pair of horizontal clipping juts are created between the internal wall of the lower accommodating channel to abut against both sides of the longitudinal gap and extending in parallel to a plane of the bottom sole, and a lateral elongated groove is inwardly created in each long lengthwise shoulder in a parallel manner respectively to run through both short transverse sides such that its gap width is smaller than its internal width;

wherein each said external cover is a unitary extruded soft plastic adapted inverted U shaped hollow band to envelop over the surface of the two clipping sleeve mounts, has a top surface, a bottom sole and two long lengthwise shoulders as well as two short transverse sides such that the top surface is adapted into a symmetric longitudinal ridge with a tapering tip, wherein a pair of parallel protruding docking bars are juxtaposed on internal walls of two long lengthwise shoulders;

wherein said elongated scraping blade is a unitary extruded soft resilient adapted band to be clipped inside two horizontal clipping juts of the clipping sleeve mount, has an upper wing section, a middle neck section, and a lower scraping edge with a tapering tip formed at a bottom side, wherein said middle neck section juxtaposes a pair of symmetric longitudinal grooves inwardly formed on both sides thereof; and wherein each said end positioning cap is a unitary extruded plastic element to securely cap over the short transverse edge of the elastic metal keelson strip, comprises a top surface, a bottom sole, a front opening end, a rear closed end and two longitudinal shoulders, wherein a slotted docking inlet with internal front edge cutaway opening section is further inwardly created in the front opening end facing towards the rear closed end such that its peripheral cross sectional profile is similar to that for the external cover but its internal size is slightly bigger than the external size of the external cover; a holding tunnel of a rectangular cross sectional profile is inwardly created further inside beneath the bottom end of the slotted docking inlet; a pair of horizontal internal knurls is protruding juxtaposed at a suitable position on both internal lateral walls of the holding tunnel; and an elastic longitudinal slit is created in parallel with longitudinal shoulders along the central line for the wall of the holding tunnel up near to the bottom sole.

13. A flat blade wiper as claimed in claim 12, wherein two corners for each said short transverse edge of the elastic metal keelson strip are trimmed into rounded corners or chamfered into beveled corners.

14. A flat blade wiper as claimed in claim 12, wherein said elastic metal keelson strip is further adapted into a bow-like shaped band of rectangular cross sectional profile with two ends extending downwardly.

15. A flat blade wiper as claimed in claim 12, wherein the cross sectional profile for the top surface of said external cover is further adapted into an asymmetric longitudinal ridge with a tapering tip.

16. A flat blade wiper as claimed in claim 12, wherein the cross sectional profile for the top surface of said end positioning cap is further adapted into a symmetric longitudinal ridge with a tapering tip.

17. A flat blade wiper as claimed in claim 12, wherein the cross sectional profile for the top surface of said end positioning cap is further adapted into an asymmetric longitudinal ridge with an uneven cambered tapering tip.

* * * * *